United States Patent
Hase et al.

(10) Patent No.: US 12,292,639 B2
(45) Date of Patent: May 6, 2025

(54) DISPLAY DEVICE

(71) Applicant: Japan Display Inc., Tokyo (JP)

(72) Inventors: Kasumi Hase, Tokyo (JP); Koichi Igeta, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/670,195

(22) Filed: May 21, 2024

(65) Prior Publication Data

US 2024/0393635 A1 Nov. 28, 2024

(30) Foreign Application Priority Data

May 24, 2023 (JP) .................... 2023-085459

(51) Int. Cl.
*G02F 1/1334* (2006.01)
*G02F 1/13357* (2006.01)
*G02F 1/1343* (2006.01)
*G02F 1/137* (2006.01)

(52) U.S. Cl.
CPC .... *G02F 1/13345* (2021.01); *G02F 1/133615* (2013.01); *G02F 1/134336* (2013.01); *G02F 1/13756* (2021.01)

(58) Field of Classification Search
CPC ............. G02F 1/13345; G02F 1/13756; G02F 1/133615; G02F 1/134336; G02F 1/134318
USPC .................................................. 349/129, 130
See application file for complete search history.

(56) References Cited

U.S. PATENT DOCUMENTS

| | | | |
|---|---|---|---|
| 10,120,244 B2* | 11/2018 | Noguchi | G09G 3/3677 |
| 2015/0029430 A1* | 1/2015 | Song | G02F 1/134336 445/24 |
| 2018/0031758 A1* | 2/2018 | Mizuno | G02F 1/137 |
| 2020/0150490 A1 | 5/2020 | Mizuno et al. | |
| 2021/0116759 A1 | 4/2021 | Mizuno et al. | |
| 2022/0113593 A1 | 4/2022 | Mizuno et al. | |
| 2022/0326576 A1* | 10/2022 | Tomioka | G02F 1/133723 |
| 2023/0152631 A1 | 5/2023 | Mizuno et al. | |

FOREIGN PATENT DOCUMENTS

JP 2018-021974 A 2/2018

* cited by examiner

*Primary Examiner* — Michael H Caley
*Assistant Examiner* — David Y Chung
(74) *Attorney, Agent, or Firm* — K&L Gates LLP

(57) ABSTRACT

According to an aspect, a display device includes: a first substrate; a second substrate facing the first substrate; a liquid crystal layer disposed between the first substrate and the second substrate; a light source disposed so that light is incident on a side surface of the first substrate or a side surface of the second substrate; a first electrode provided on the first substrate; and second electrodes provided on the second substrate. The liquid crystal layer includes polymer-dispersed liquid crystals including a polymer network formed in a mesh shape and liquid crystal molecules held in a dispersed manner in gaps of the polymer network. A plurality of first slits of the second electrodes that are provided for each pixel are arranged at predetermined intervals in a first direction, and the first slits extend in a second direction intersecting the first direction.

12 Claims, 26 Drawing Sheets

DISPLAY DEVICE

CROSS-REFERENCE TO RELATED APPLICATION

This application claims the benefit of priority from Japanese Patent Application No. 2023-085459 filed on May 24, 2023, the entire contents of which are incorporated herein by reference.

BACKGROUND

1. Technical Field

What is disclosed herein relates to a display device.

2. Description of the Related Art

Japanese Patent Application Laid-open Publication No. 2018-021974 (JP-A-2018-021974) describes a display device that includes a first light-transmitting substrate, a second light-transmitting substrate disposed so as to face the first light-transmitting substrate, a liquid crystal layer including polymer-dispersed liquid crystals filled between the first and the second light-transmitting substrates, and at least one light emitter disposed so as to face at least one of side surfaces of the first and the second light-transmitting substrates.

In the display device described in JP-A-2018-021974, a polymer network is formed by polymerizing monomers, and this polymer network is mixed with liquid crystal molecules in the liquid crystal layer.

The liquid crystal molecules near an orientation film may behave differently from those in a central portion of the liquid crystal layer. Specifically, the initial orientation of the liquid crystal molecules in the central portion of the liquid crystal layer varies. Therefore, when a voltage is applied to pixel electrodes, the liquid crystal molecules may be driven in random directions. As a result, scattering characteristics of the liquid crystal molecules that depend on the applied voltage may vary pixel by pixel. The pixel-by-pixel variation in the scattering characteristics of the liquid crystal molecules depending on the applied voltage may cause unintended deterioration in display quality.

For the foregoing reasons, there is a need for a display device that improves the display quality.

SUMMARY

According to an aspect, a display device includes: a first substrate; a second substrate facing the first substrate; a liquid crystal layer disposed between the first substrate and the second substrate; a light source disposed so that light is incident on a side surface of the first substrate or a side surface of the second substrate; a first electrode provided on the first substrate; and second electrodes provided on the second substrate. The liquid crystal layer includes polymer-dispersed liquid crystals including a polymer network formed in a mesh shape and liquid crystal molecules held in a dispersed manner in gaps of the polymer network. A plurality of first slits between the second electrodes that are provided for each pixel are arranged at predetermined intervals in a first direction, and the first slits extend in a second direction intersecting the first direction.

DETAILED DESCRIPTION

Figure 1:
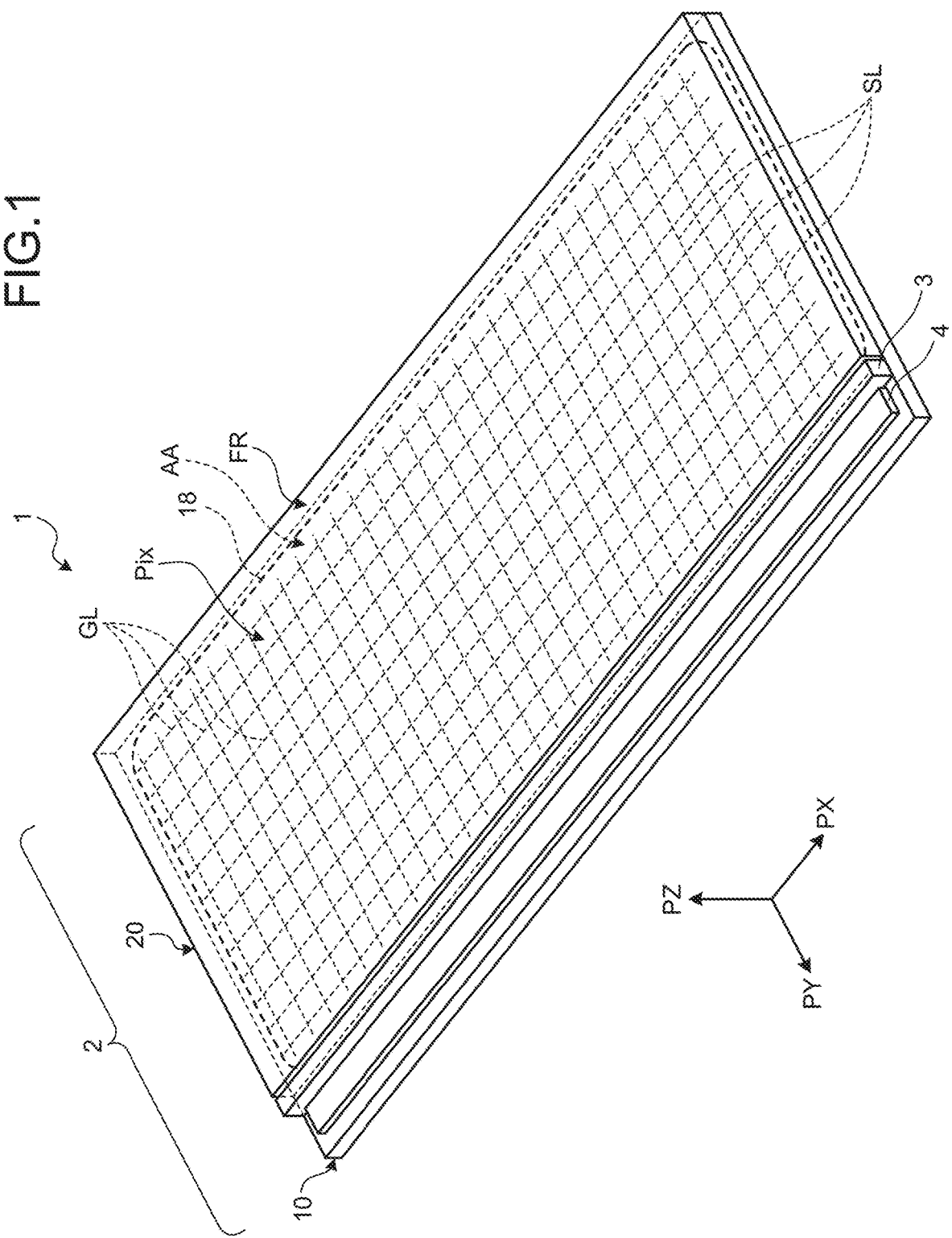
FIG. 1 is a perspective view illustrating an example of a display device according to an embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
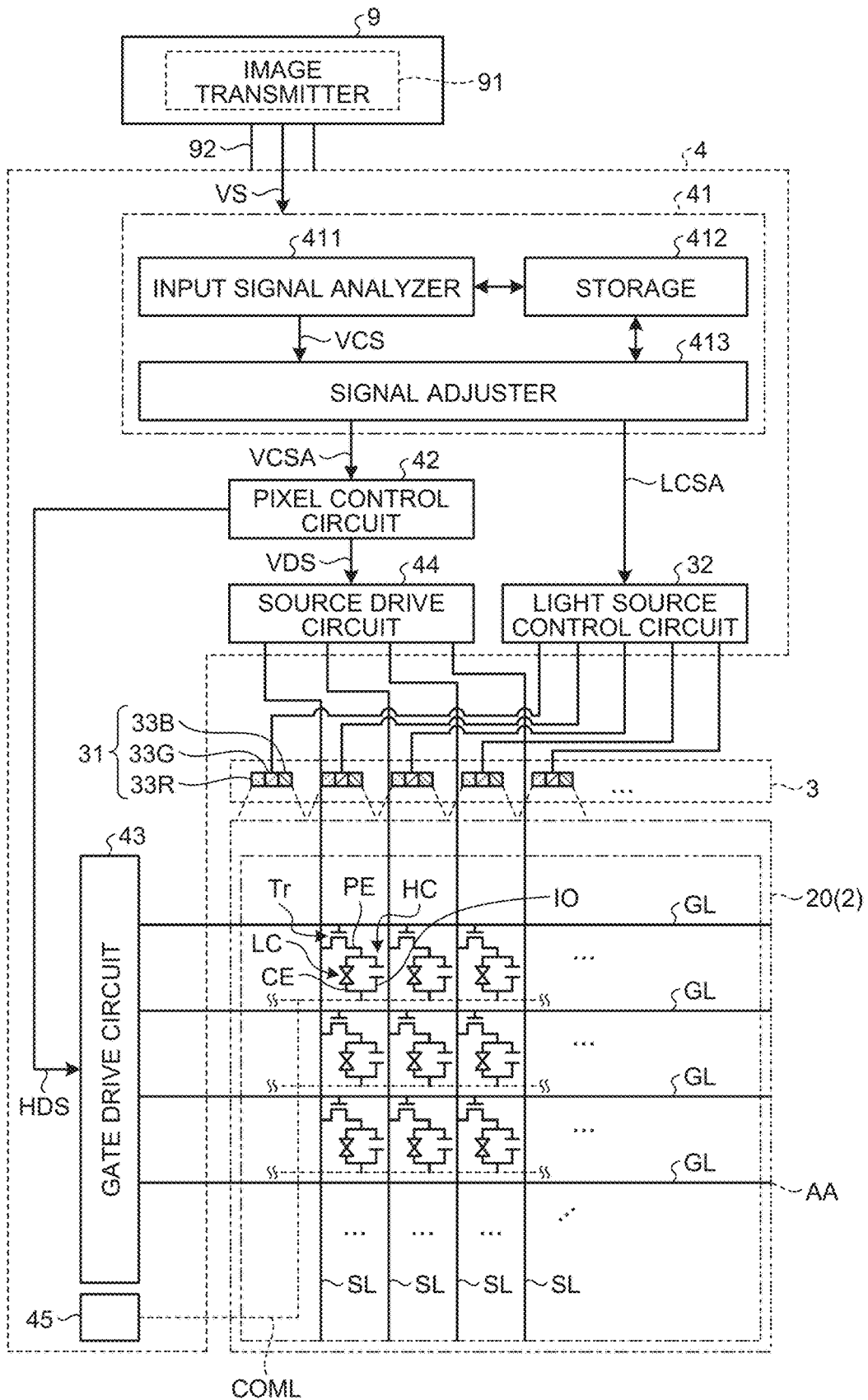
FIG. 2 is a block diagram illustrating the display device of a first embodiment of the present disclosure.
Figure 3:
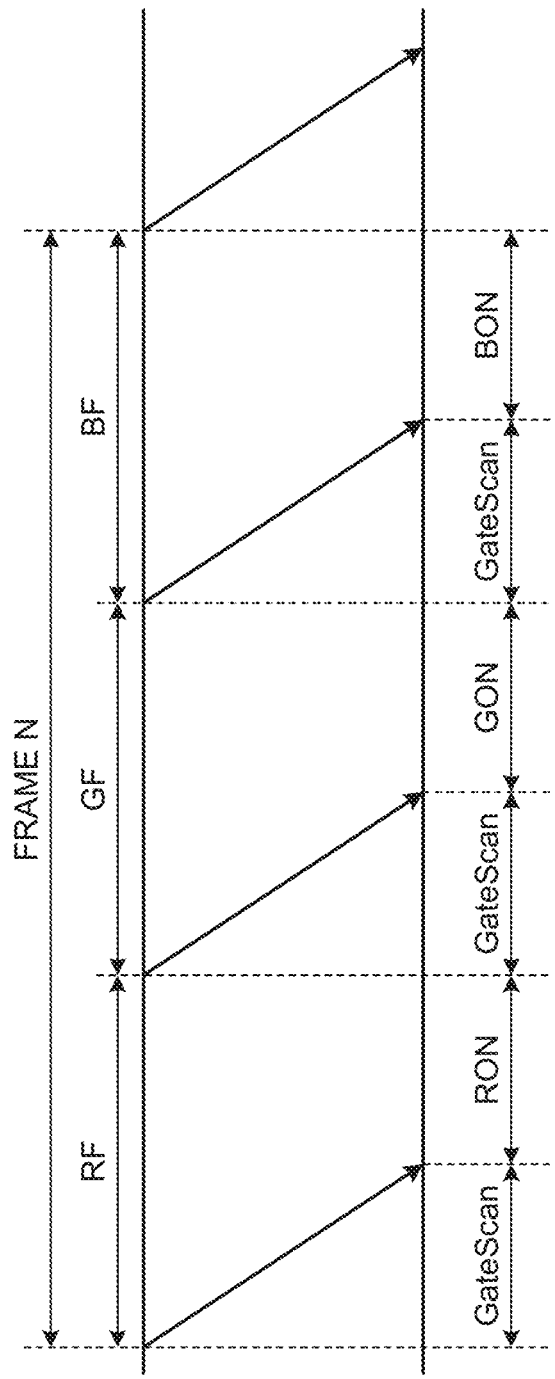
FIG. 3 is a timing diagram illustrating timing of light emission by a light source in a field-sequential system of the first embodiment.

FIG. 1 is a perspective view illustrating an example of a display device according to an embodiment of the present disclosure. FIG. 2 is a block diagram illustrating the display device of FIG. 1. FIG. 3 is a timing diagram illustrating timing of light emission by a light source in a field-sequential system.

As illustrated in FIG. 1, a display device 1 includes a display panel 2, a light source 3, and a drive circuit 4. A first direction PX denotes one direction in the plane of the display panel 2. A second direction PY denotes a direction orthogonal to the first direction PX. A third direction PZ denotes a direction orthogonal to the PX-PY plane.

Figure 5:
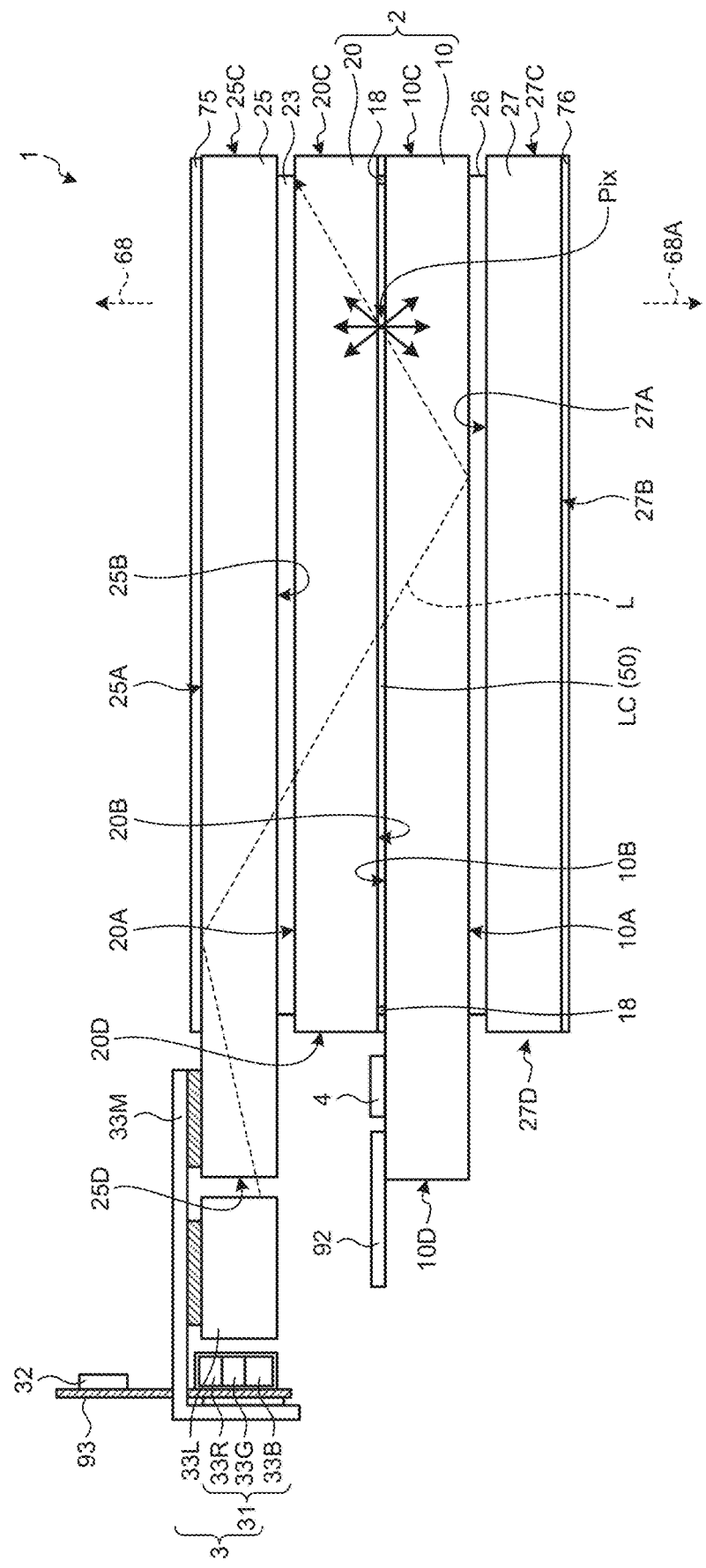
FIG. 5 is a sectional view illustrating an example of a section of the display device of FIG. 1.

The display panel 2 includes an array substrate 10, a counter substrate 20, and a liquid crystal layer 50 (refer to FIG. 5). The counter substrate 20 faces a surface of the array substrate 10 in a direction orthogonal thereto (in the direction PZ illustrated in FIG. 1). In the liquid crystal layer 50 (refer to FIG. 5), polymer-dispersed liquid crystals LC are sealed by the array substrate 10, the counter substrate 20, and a sealing portion 18.

As illustrated in FIG. 1, the display panel 2 has a display region AA capable of displaying images and a peripheral region FR outside the display region AA. A plurality of pixels Pix are arranged in a matrix having a row-column configuration in the display region AA. In the present disclosure, a row refers to a pixel row including m pixels Pix arranged in one direction. In addition, a column refers to a pixel column including n pixels Pix arranged in a direction orthogonal to the direction in which the rows are arranged. The values of m and n are defined depending on a display resolution in the vertical direction and a display resolution in the horizontal direction. A plurality of scan lines GL are provided corresponding to the rows, and a plurality of signal lines SL are provided corresponding to the columns.

The light source 3 includes a plurality of light emitters 31. As illustrated in FIG. 2, a light source controller (light source control circuit) 32 is included in the drive circuit 4. The light source controller 32 may be a circuit separate from the drive circuit 4. The light emitters 31 may be electrically coupled to the light source controller 32 through wiring in the array substrate 10.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area in the PX-PY plane that is larger than that of the counter substrate 20, and the drive circuit 4 is provided on a projecting portion of the array substrate 10 exposed from the counter substrate 20.

The signal processing circuit 41 receives a first input signal (such as a red-green-blue (RGB) signal) VS from an image transmitter 91 of an external higher-level controller 9 through a flexible substrate 92.

The signal processing circuit 41 includes an input signal analyzer 411, a storage 412, and a signal adjuster 413. The input signal analyzer 411 generates a second input signal VCS based on the externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42 and transmits a light source control signal LCSA to the light source controller 32. The light source control signal LCSA is a signal including information on light quantities of the light emitters 31 set according to, for example, input gradation values to be given to the pixels Pix. For example, the light quantities of the light emitters 31 are set smaller when a darker image is to be displayed. When a brighter image is to be displayed, the light quantities of the light emitters 31 are set larger.

The pixel control circuit 42 generates a horizontal drive signal HDS and a vertical drive signal VDS based on the third input signal VCSA. In the present embodiment, since the display device 1 is driven based on the field-sequential system, the horizontal drive signal HDS and the vertical drive signal VDS are generated for each color emittable by the light emitters 31.

The gate drive circuit 43 sequentially selects the scan lines GL of the display panel 2 based on the horizontal drive signal HDS within one vertical scan period. The scan lines GL can be selected in any order.

The source drive circuit 44 supplies a gradation signal corresponding to an output gradation value of each of the pixels Pix to each of the signal lines SL of the display panel 2 based on the vertical drive signal VDS within one horizontal scan period.

In the present embodiment, the display panel 2 is an active matrix panel. Therefore, the display panel 2 includes the signal (source) lines SL extending in the second direction PY and the scan (gate) lines GL extending in the first direction PX in plan view, and includes switching elements Tr at intersections between the signal lines SL and the scan lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to the signal line SL. The gate electrode of the switching element Tr is coupled to the scan line GL. The other of the source electrode and the drain electrode is coupled to one end of a capacitor of the polymer-dispersed liquid crystals LC. The capacitor of the polymer-dispersed liquid crystals LC is coupled at one end thereof to the switching element Tr through a pixel electrode PE, and coupled at the other end thereof to common potential wiring COML through a common electrode CE. Holding capacitance HC is generated between the pixel electrode PE and a holding capacitance electrode IO electrically coupled to the common potential wiring COML. The pixel electrode PE is a first electrode and the common electrode CE is a second electrode. A potential of the common potential wiring COML is supplied by the common potential drive circuit 45.

The light emitters 31 include a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scan period GateScan scatter light to perform display. On the entire display panel 2, if the gradation signal corresponding to the output gradation value of each of the pixels Pix is supplied to each of the signal lines SL described above for the pixels Pix selected during the one vertical scan period GateScan, only the first color is lit up during the first color light emission period RON.

Then, in a second sub-frame (second predetermined time) GF, the light emitter 33G of the second color emits light during a second color light emission period GON, and the pixels Pix selected during the one vertical scan period GateScan scatter light to perform display. On the entire display panel 2, if the gradation signal corresponding to the output gradation value of each of the pixels Pix is supplied to each of the signal lines SL described above for the pixels Pix selected during the one vertical scan period GateScan, only the second color is lit up during the second color light emission period GON.

Further, in a third sub-frame (third predetermined time) BF, the light emitter 33B of the third color emits light during a third color light emission period BON, and the pixels Pix selected during the one vertical scan period GateScan scatter light to perform display. On the entire display panel 2, if the gradation signal corresponding to the output gradation value of each of the pixels Pix is supplied to each of the signal lines SL described above for the pixels Pix selected during the one vertical scan period GateScan, only the third color is lit up during the third color light emission period BON.

Since a human eye has limited temporal resolving power and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 4:
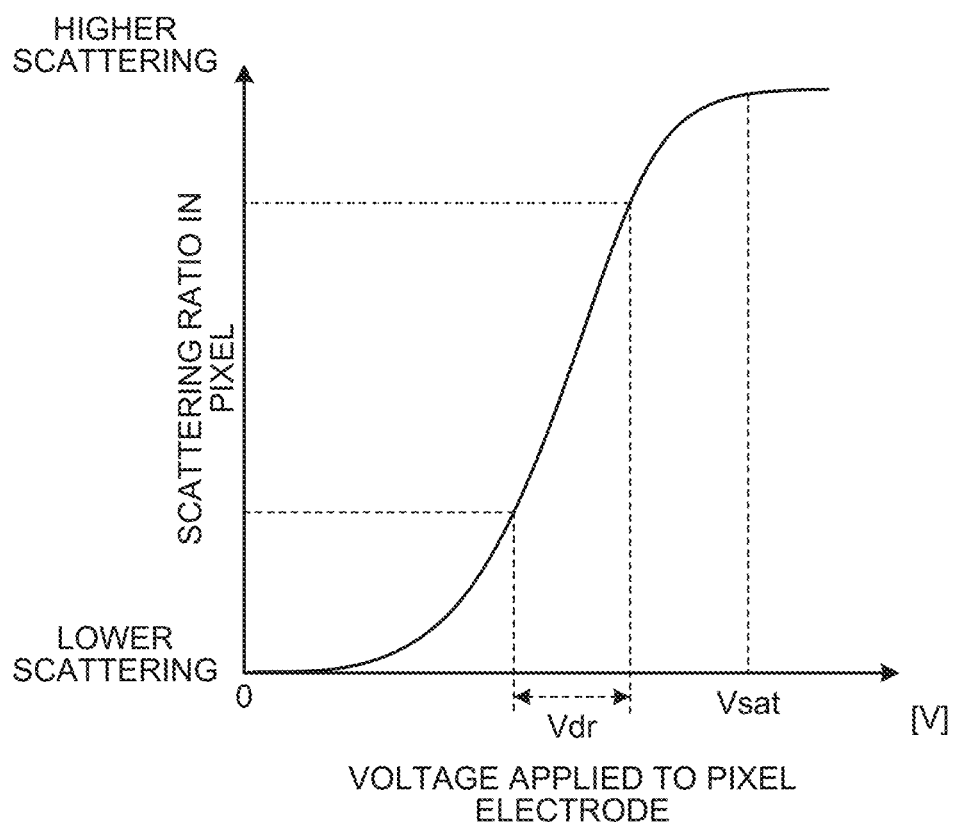
FIG. 4 is an explanatory diagram illustrating a relation between a voltage applied to a pixel electrode and a scattering state of a pixel.
Figure 6:
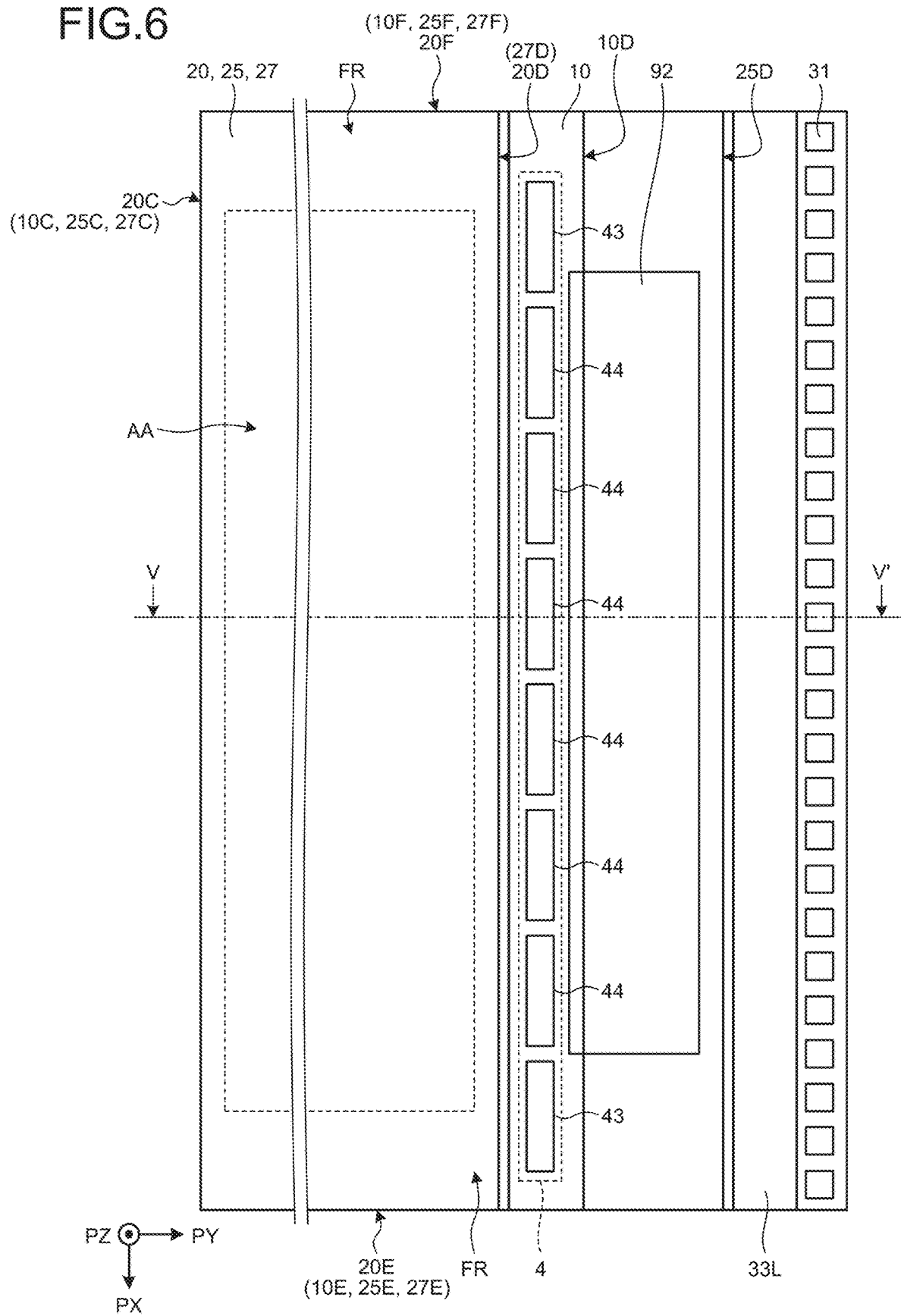
FIG. 6 is a plan view illustrating a planar surface of the display device of FIG. 1.

FIG. 4 is an explanatory diagram illustrating a relation between a voltage applied to the pixel electrode and a scattering state of the pixel. FIG. 5 is a sectional view illustrating an example of a section of the display device of FIG. 1. FIG. 6 is a plan view illustrating a planar surface of the display device of FIG. 1. FIG. 5 illustrates a section along V-V' of FIG. 6.

If the gradation signal corresponding to the output gradation value of each of the pixels Pix is supplied to each of the signal lines SL described above for the pixels Pix selected during the one vertical scan period GateScan, a voltage applied to the pixel electrode PE changes with the gradation signal. The change in the voltage applied to the pixel electrode PE changes the voltage between the pixel electrode PE and the common electrode CE. As illustrated in FIG. 4, the scattering state of the liquid crystal layer 50 for each of the pixels Pix is controlled according to the voltage applied to the pixel electrode PE, and the scattering ratio in the pixel Pix changes, as illustrated in FIG. 4.

As illustrated in FIG. 4, the change in the scattering ratio in the pixel Pix becomes smaller when the voltage applied to the pixel electrode PE becomes equal to or higher than a saturation voltage Vsat. Therefore, the drive circuit 4 changes the voltage applied to the pixel electrode PE according to the vertical drive signal VDS within a voltage range Vdr lower than the saturation voltage Vsat.

As illustrated in FIG. 5, the display device 1 includes a light-transmitting first base member 25, the display panel 2, and a light-transmitting second base member 27. A protective layer 75 is provided on one surface of the light-transmitting first base member 25. A protective layer 76 is provided on one surface of the light-transmitting second base member 27.

The display panel 2 includes the array substrate 10, the counter substrate 20, and the liquid crystal layer 50. The counter substrate 20 faces the surface of the array substrate 10 in a direction orthogonal thereto (in the direction PZ illustrated in FIG. 1). In the liquid crystal layer 50, the polymer-dispersed liquid crystals (to be described later) are sealed by the array substrate 10, the counter substrate 20, and the sealing portion 18.

As illustrated in FIGS. 5 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel flat surfaces. The first side surface 10C and the second side surface 10D are parallel flat surfaces. The third side surface 10E and the fourth side surface 10F are parallel flat surfaces.

As illustrated in FIGS. 5 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel flat surfaces. The first side surface 20C and the second side surface 20D are parallel flat surfaces. The third side surface 20E and the fourth side surface 20F are parallel flat surfaces.

As illustrated in FIGS. 5 and 6, the first base member 25 has a first principal surface 25A, a second principal surface 25B, a first side surface 25C, a second side surface 25D, a third side surface 25E, and a fourth side surface 25F. The first principal surface 25A and the second principal surface 25B are parallel flat surfaces. The first side surface 25C and the second side surface 25D are parallel flat surfaces. The third side surface 25E and the fourth side surface 25F are parallel flat surfaces.

The first base member 25 is bonded to the first principal surface 20A of the counter substrate 20 with an optical resin 23 interposed therebetween. The first base member 25 is a protective substrate for the counter substrate 20, and is formed, for example, of glass or a light-transmitting resin. When the first base member 25 is formed of a glass base material, it is also called a cover glass. When the first base member 25 is formed of a light-transmitting resin, it may be flexible. The same base material as the first base member 25 may be bonded to the first principal surface 10A of the array substrate 10 with an optical resin interposed therebetween.

As illustrated in FIGS. 5 and 6, the second base member 27 has a first principal surface 27A, a second principal surface 27B, a first side surface 27C, a second side surface 27D, a third side surface 27E, and a fourth side surface 27F. The first principal surface 27A and the second principal surface 27B are parallel flat surfaces. The first side surface 27C and the second side surface 27D are parallel flat surfaces. The third side surface 27E and the fourth side surface 27F are parallel flat surfaces. The second base member 27 is bonded to the first principal surface 10A of the array substrate 10 with an optical resin 26 interposed therebetween. The second base member 27 is a protective substrate for the array substrate 10, and is formed of, for example, glass or a light-transmitting resin. When the second base member 27 is formed of a glass base material, it is also called a cover glass. When the second base member 27 is formed of a light-transmitting resin, it may be flexible.

As illustrated in FIGS. 5 and 6, the light source 3 faces the second side surface 25D of the first base member 25. The light source 3 may also be called a side light source. As illustrated in FIG. 5, the light source 3 emits light-source light to the second side surface 25D of the first base member 25. The second side surface 25D of the first base member 25 facing the light source 3 serves as a plane of light incidence. The plane of light incidence facing the light source 3 may be the second side surface 20D of the counter substrate 20 or the second side surface 27D of the second base member 27.

The light source 3 includes the light emitters 31 and a light guide 33L. The light emitters 31 include the light emitter 33R of the first color (such as red), the light emitter 33G of the second color (such as green), and the light emitter 33B of the third color (such as blue). The light guide 33L guides the light emitted by the light emitter 33R of the first color, the light emitter 33G of the second color, and the light emitter 33B of the third color to the second side surface 25D of the first base member 25. The light guide 33L simultaneously receives the light from the light emitters 31, internally diffuses the received light, and emits the diffused light to the display panel 2. As a result, the distribution of light per unit area irradiating the second side surface 25D of the first base member 25 is made uniform.

The light guide 33L is a single light guide 33L formed integrally from the third side surface 25E to the fourth side surface 25F. The light guide 33L may be formed by arranging a plurality of divided light guides from the third side surface 25E to the fourth side surface 25F. The light guide 33L may be formed by arranging the divided light guides from the third side surface 25E to the fourth side surface 25F and connecting the adjacent light guides to each other.

The light emitters 31 and the light guide 33L are fixed together with an adhesive material or the like, and assembled to a support 33M to form a light source module. The support 33M is mounted so as to overlap the first principal surface 25A of the first base member 25, and is fixed to the first base member 25 with an adhesive material or the like.

A wiring substrate 93 (flexible printed circuit board or printed circuit board (PCB) substrate) is provided with an integrated circuit of the light source controller 32, and the light source controller 32 is coupled to the light source 3 through the wiring substrate 93 (flexible printed circuit board or PCB substrate). The wiring substrate 93 is fixed to the support 33M with an adhesive material or the like.

As illustrated in FIG. 5, light-source light L emitted from the light source 3 propagates in a direction (second direction PY) away from the second side surface 20D while being reflected by any of the first base member 25, the array substrate 10, the counter substrate 20, and the second base member 27.

As illustrated in FIG. 5, the light-source light L that has propagated in any of the first base member 25, the array substrate 10, the counter substrate 20, and the second base member 27 is scattered by the pixels Pix including the liquid crystals in the scattering state, and the angle of incidence of the scattered light becomes an angle smaller than the critical angle. Thus, emission light 68 and 68A is emitted outward from the first principal surface 20A of the counter substrate 20 (the first principal surface 25A of the first base member 25) and the first principal surface 10A of the array substrate 10, respectively. The emission light 68 and 68A emitted outward from the first principal surface 20A of the counter substrate 20 and the first principal surface 10A of the array substrate 10, respectively, is viewed by a viewer.

Therefore, as illustrated in FIG. 6, the light emitters 31 are arranged at a predetermined pitch in a region provided in the second direction PY with respect to the display region AA.

As illustrated in FIG. 6, the drive circuit 4 includes a plurality of integrated circuits of the gate drive circuit 43 and a plurality of integrated circuits of the source drive circuit 44.

Figure 7:
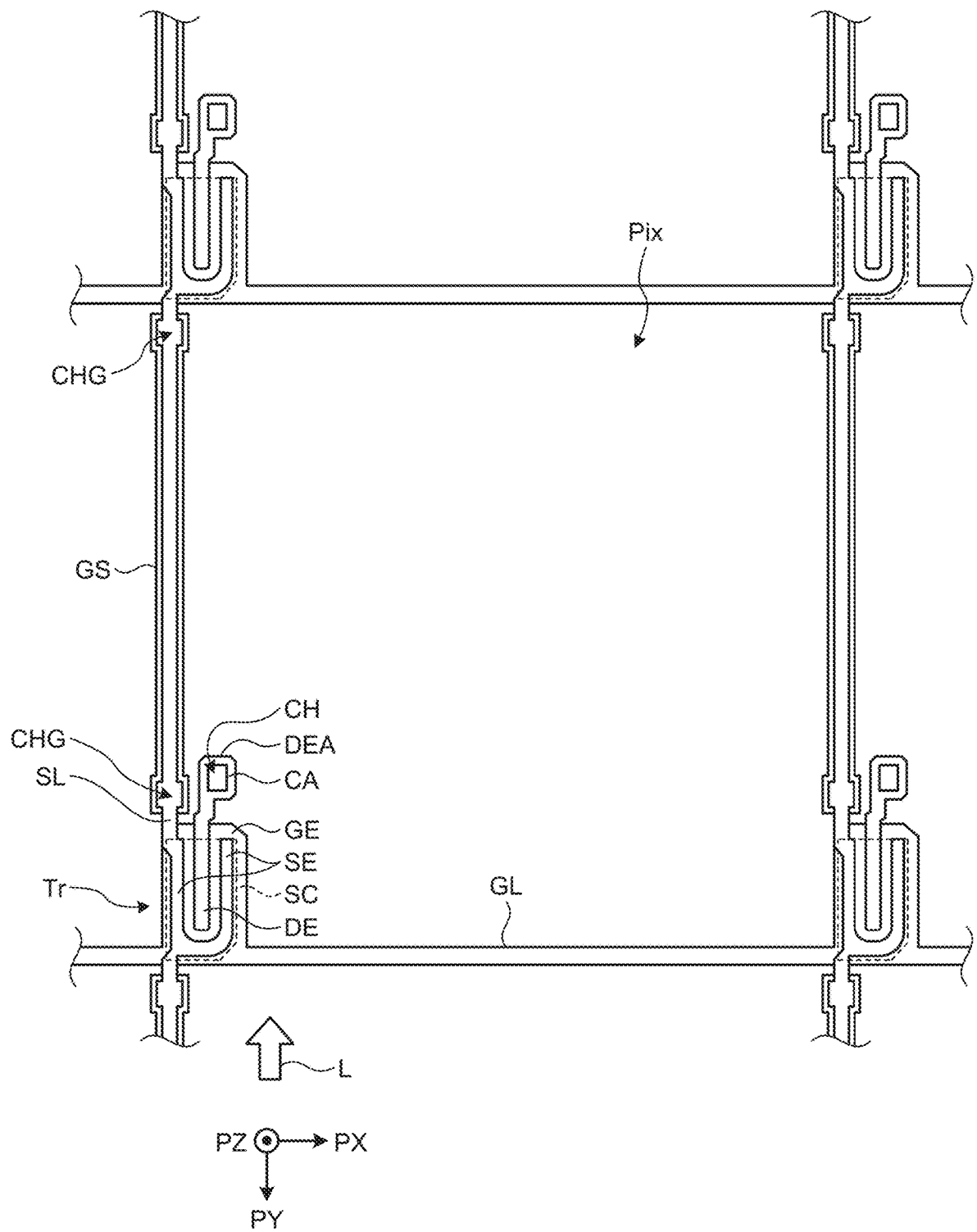
FIG. 7 is a plan view illustrating scan lines, signal lines, and a switching element in the pixel.
Figure 8:
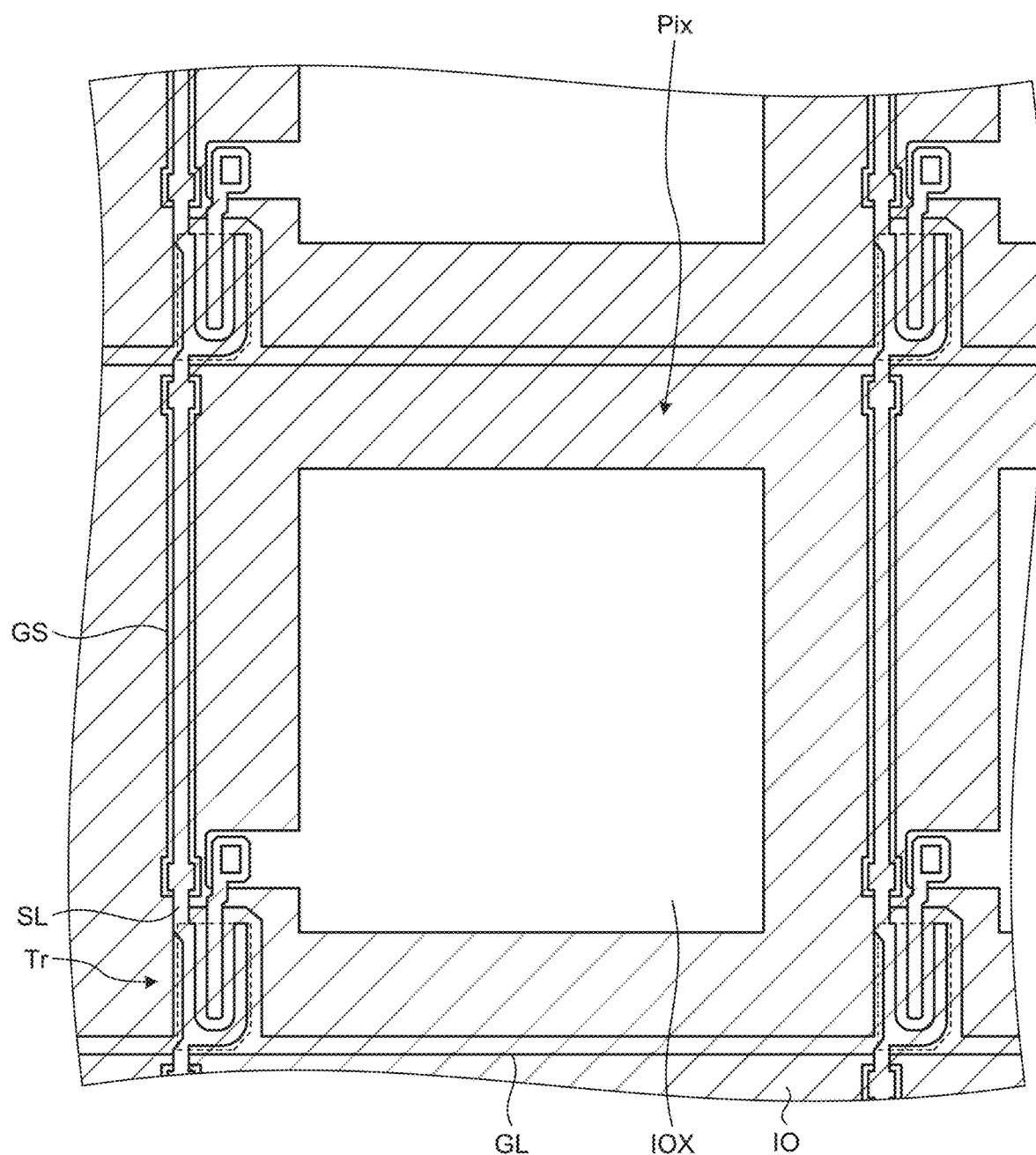
FIG. 8 is a plan view illustrating a holding capacitance layer in the pixel.
Figure 9:
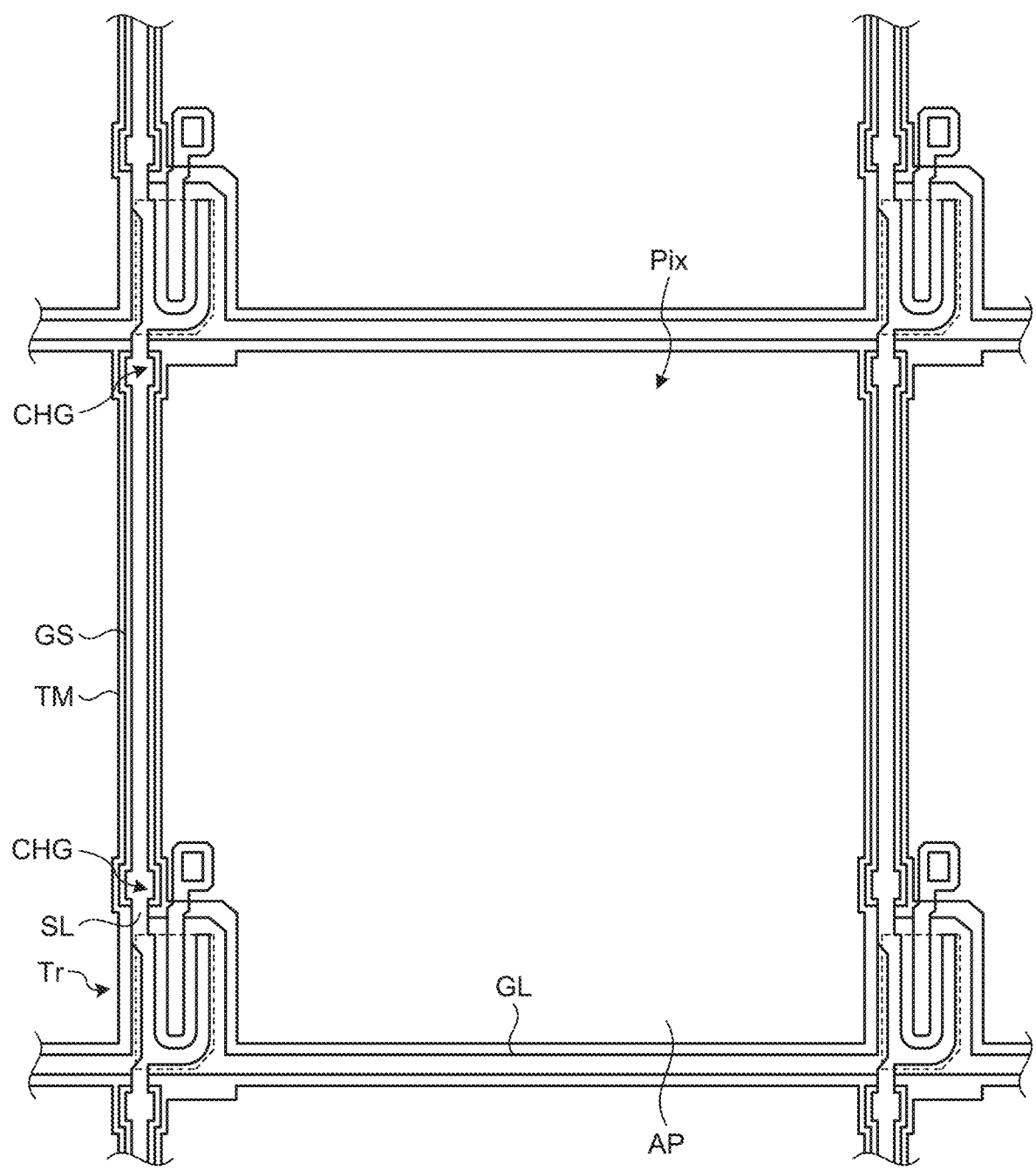
FIG. 9 is a plan view illustrating an auxiliary metal layer and an opening region in the pixel.
Figure 10:
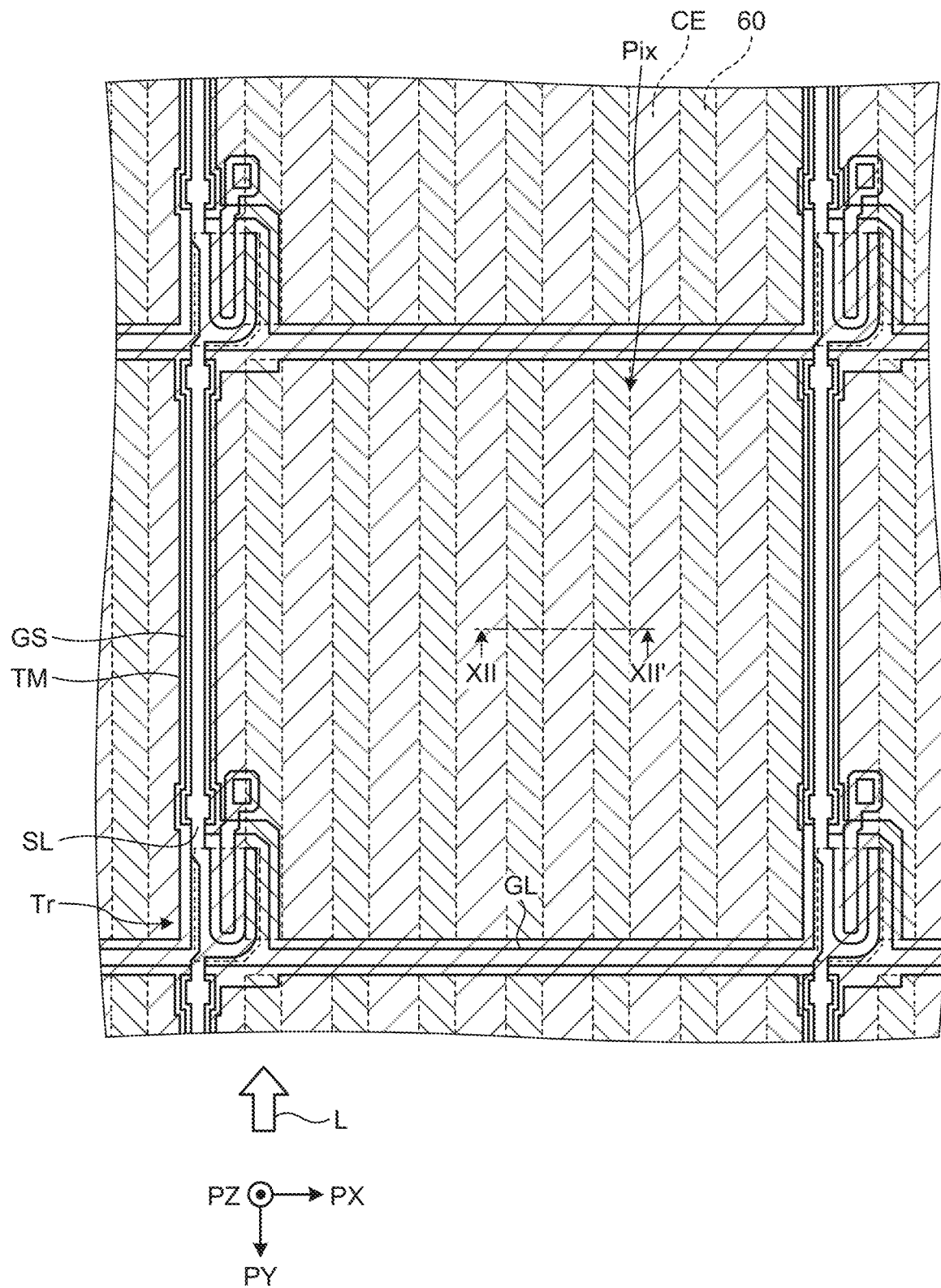
FIG. 10 is a plan view for describing a common electrode in the pixel.
Figure 11:
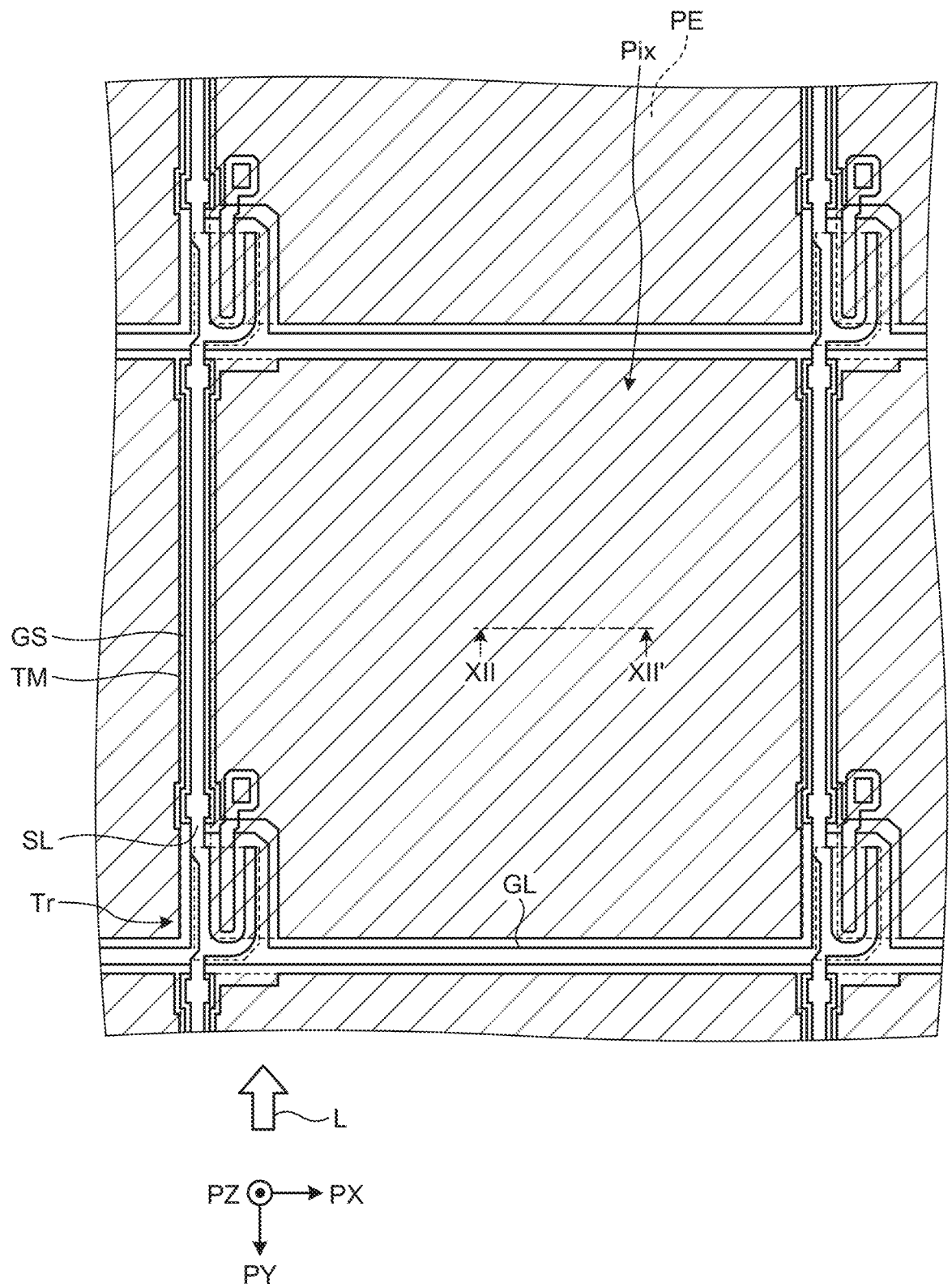
FIG. 11 is a plan view for describing the pixel electrode in the pixel.

FIG. 7 is a plan view illustrating the scan lines, the signal lines, and the switching element in the pixel. FIG. 8 is a plan view illustrating a holding capacitance layer in the pixel. FIG. 9 is a plan view illustrating an auxiliary metal layer and an opening region in the pixel. FIG. 10 is a plan view for describing the common electrode in the pixel. FIG. 11 is a plan view for describing the pixel electrode in the pixel. As illustrated in FIGS. 1, 2, 10, and 11, the signal lines SL and the scan lines GL are provided in a grid pattern in plan view on the array substrate 10. In other words, one surface of the array substrate 10 is provided with the signal lines arranged at intervals in the first direction PX and the scan lines arranged at intervals in the second direction PY.

As illustrated in FIG. 7, a region surrounded by the adjacent scan lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in plan view, a gate electrode GE electrically coupled to the scan line GL.

As illustrated in FIG. 7, the scan line GL is wiring of a metal such as molybdenum (Mo) or aluminum (Al), a multilayered body of these metals, or an alloy of these metals. The signal line SL is wiring of a metal such as aluminum or an alloy thereof.

As illustrated in FIG. 7, the semiconductor layer SC is provided so as not to protrude from the gate electrode GE in plan view. As a result, the light-source light L traveling toward the semiconductor layer SC from the gate electrode GE side is reflected, and light leakage is less likely to occur in the semiconductor layer SC.

As illustrated in FIG. 5, the light-source light L emitted from the light source 3 is incident in the second direction PY serving as a direction of incidence. The direction of incidence refers to a direction from the second side surface 20D closest to the light source 3 toward the first side surface 20C that is a surface opposite to the second side surface 20D. When the direction of incidence of the light-source light L is the second direction PY, the length in the first direction PX of the semiconductor layer SC is smaller than the length in the second direction PY of the semiconductor layer SC. This configuration reduces the length in a direction intersecting the direction of incidence of the light-source light L, and thereby, reduces the effect of light leakage.

As illustrated in FIG. 7, two electrical conductors of a source electrode SE that are the same as the signal line SL extend from the signal line SL in the same layer as that of the signal line SL and in a direction intersecting the signal line. With this configuration, the source electrode SE electrically coupled to the signal line SL overlaps one end of the semiconductor layer SC in plan view.

As illustrated in FIG. 7, in plan view, a drain electrode DE is provided in a position between the adjacent electrical conductors of the source electrode SE. The drain electrode DE overlaps the semiconductor layer SC in plan view. A portion of the semiconductor layer SC overlapping neither the source electrode SE nor the drain electrode DE serves as a channel of the switching element Tr.

As illustrated in FIG. 10, a plurality of first slits 60 provided for each of the pixels Pix are arranged at predetermined intervals in the first direction PX between the common electrodes CE, and each of the first slits 60 is provided so as to extend in the second direction PY intersecting the first direction PX. The ends of the first slit 60 overlap the scan lines GL. The ends of the first slit 60 are closed by a light-transmitting conductive material of the common electrode CE at locations overlapping the scan lines GL. The width of the first slit 60 is 10 µm, for example. The width of the first slit 60 is preferably 3 µm to 20 µm.

As illustrated in FIG. 11, the pixel electrodes PE are separate from each other so as to correspond to the pixels Pix. A contact electrode DEA electrically coupled to the drain electrode DE is electrically coupled to the pixel electrode PE through a contact hole CH.

Figure 12:
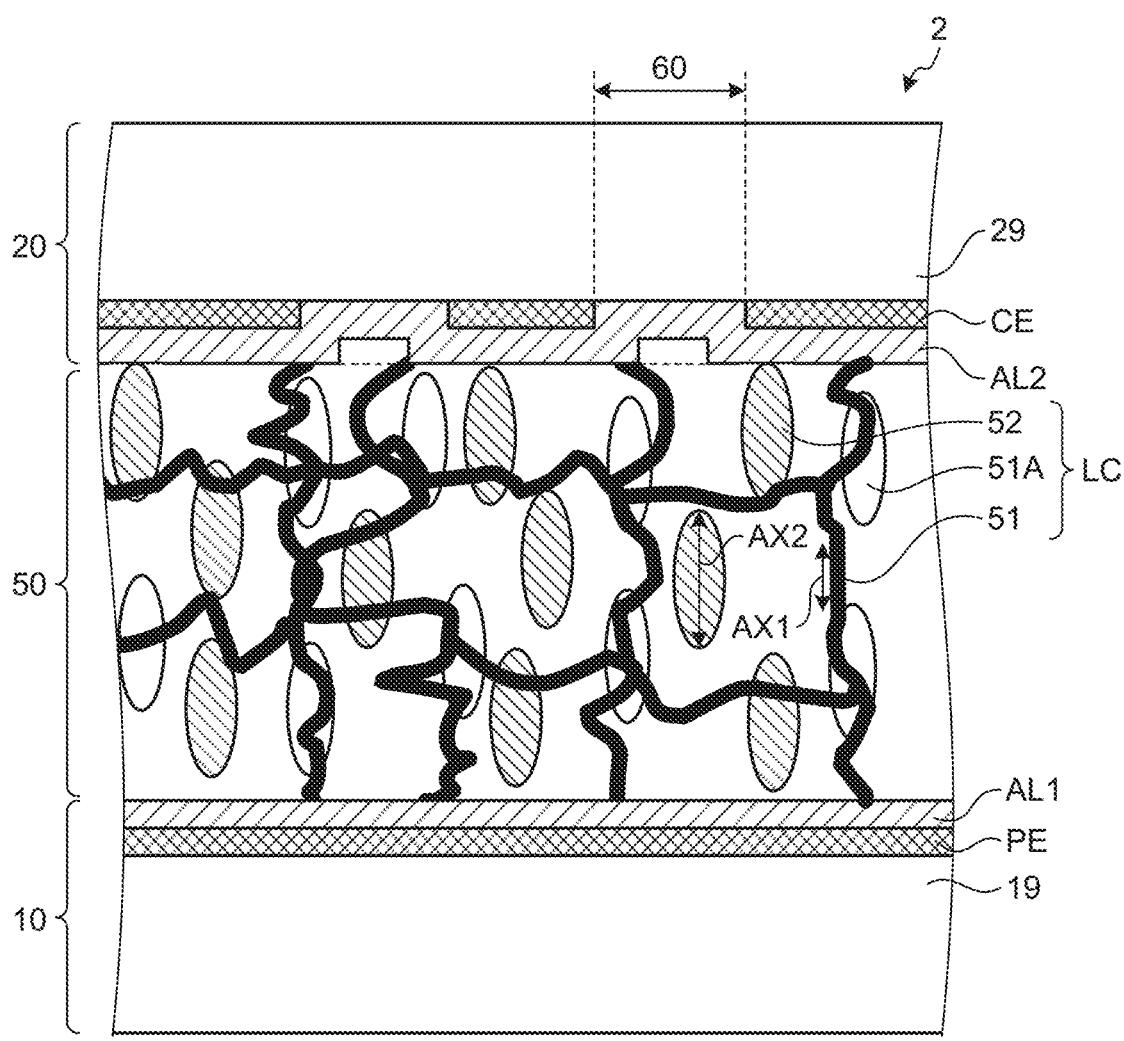
FIG. 12 is a sectional view along XII-XII' of FIGS. 10 and 11.
Figure 13:
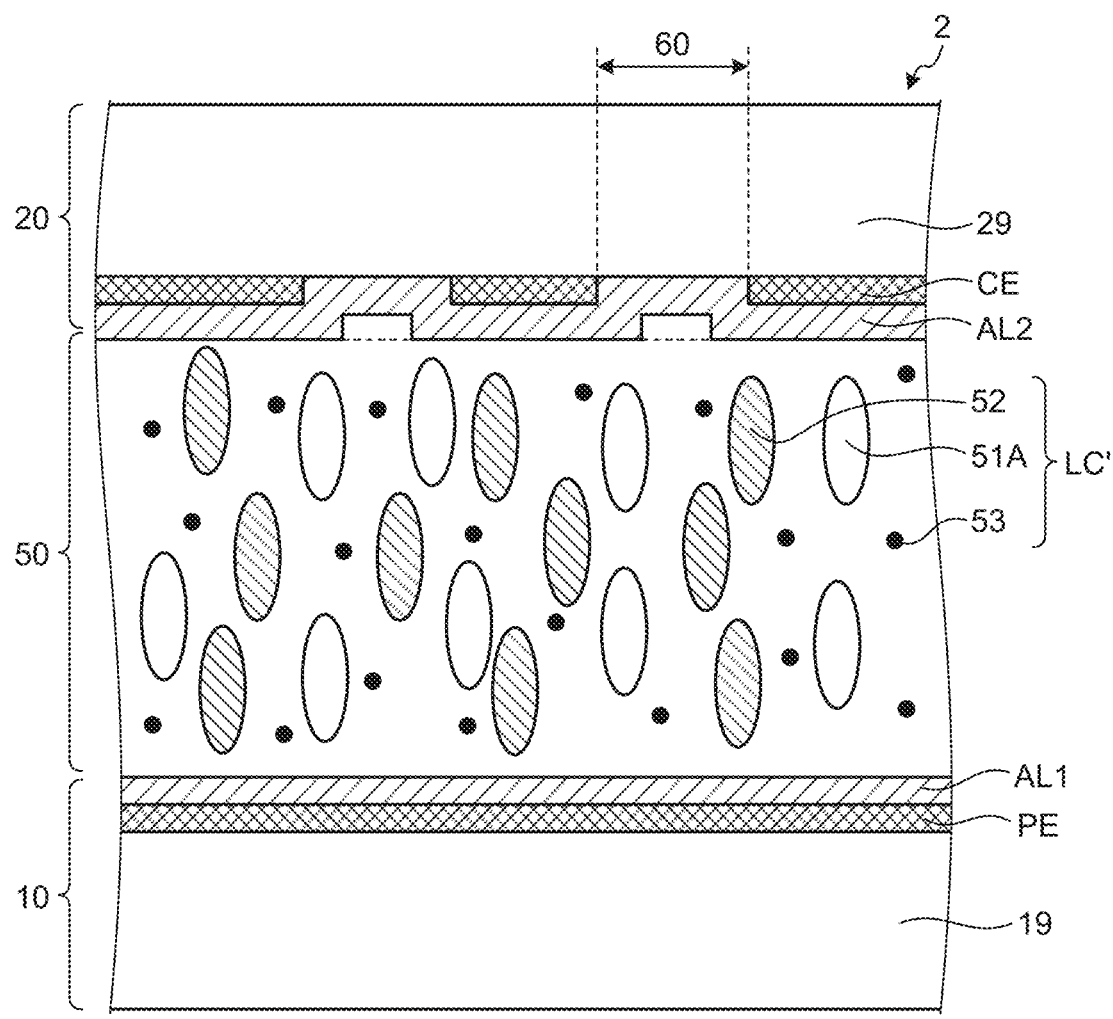
FIG. 13 is a sectional view illustrating a state before monomers in a liquid crystal layer are polymerized.
Figure 14:
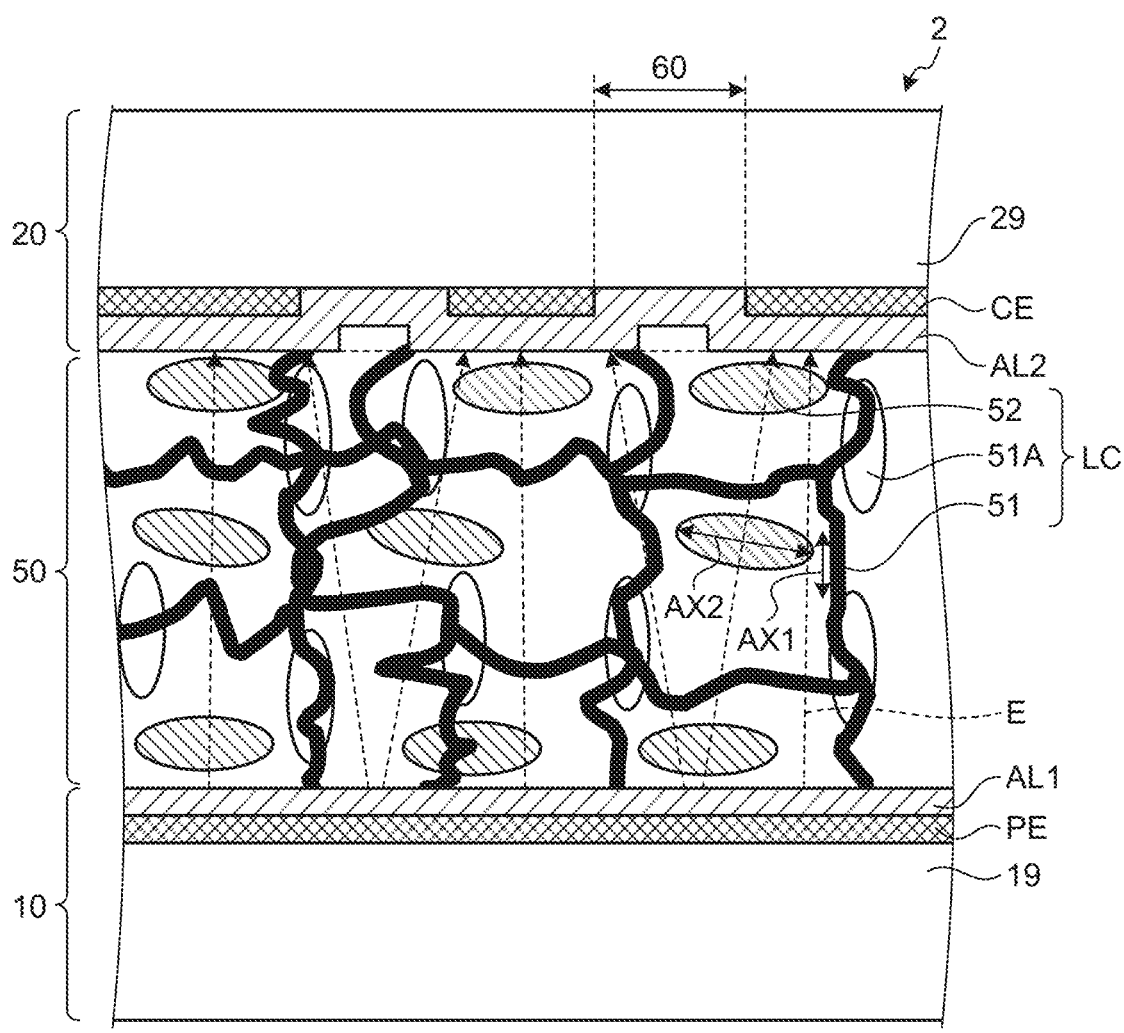
FIG. 14 is a sectional view for describing the scattering state of the liquid crystal layer.

The following describes the array substrate 10, the counter substrate 20, and the liquid crystal layer 50 included in the display panel 2. FIG. 12 is a sectional view along XII-XII' of FIGS. 10 and 11. FIG. 12 illustrates the liquid crystal layer in a state after monomers are polymerized. FIG. 12 also illustrates the liquid crystal layer in a non-scattering state. FIG. 13 is a sectional view illustrating a state before the monomers in the liquid crystal layer are polymerized. FIG. 14 is a sectional view for describing the scattering state of the liquid crystal layer.

As illustrated in FIG. 12, the array substrate 10 includes a first light-transmitting base member 19, the pixel electrode PE, and a first orientation film (orientation film) AL1. The first orientation film AL1 is provided on the pixel electrode PE. The counter substrate 20 includes a second light-transmitting base member 29, the common electrode CE, and a second orientation film (orientation film) AL2. The first slits 60 are provided between the common electrodes CE, and the second orientation film AL2 is provided so as to cover the common electrodes CE and the first slits 60 entirely. The liquid crystal layer 50 is sealed between the first orientation film AL1 and the second orientation film AL2. The array substrate 10 may include a protective member (not illustrated) formed of, for example, glass, on a surface opposite to a surface of the first light-transmitting base member 19 on which the pixel electrode PE and the first orientation film (orientation film) AL1 are provided. The protective member may be made of a resin, as long as having a light-transmitting property. The counter substrate 20 may include a protective member (not illustrated) formed of, for example, glass, on a surface opposite to a surface of the second light-transmitting base member 29 on which the common electrode CE and the second orientation film (orientation film) AL2 are provided. The protective member may be made of a resin, as long as having a light-transmitting property.

The first light-transmitting base member 19 and the second light-transmitting base member 29 are light-transmitting base members formed, for example, of glass. The pixel electrode PE and the common electrode CE are formed of a light-transmitting conductive material such as indium tin oxide (ITO). The first and the second orientation films AL1 and AL2 cause liquid crystal molecules 52 in the liquid crystal layer 50 to be oriented in a predetermined direction and are formed of a light-transmitting orientation film material such as polyimide. The first light-transmitting base member 19 and the second light-transmitting base member 29 may be made of a resin such as polyethylene terephthalate, as long as having a light transmitting property.

In the present embodiment, for example, a rubbing treatment (rubbing orientation treatment) is applied to surfaces (surfaces to be in contact with the liquid crystal layer 50) of the first and the second orientation films AL1 and AL2, whereby the first and the second orientation films AL1 and AL2 become vertical orientation films. The rubbing treatment refers to rubbing each of the surfaces of the first and the second orientation films AL1 and AL2 with a cloth or the like along one direction to make the surface anisotropic so as to give the films a liquid crystal orientation. The orientation treatment is not limited to the rubbing treatment, but may be a photo-orientation treatment in which the orientation treatment is performed by light irradiation.

As illustrated in FIG. 13, a solution LC' containing a plurality of photocrosslinkable monomers 51A, the liquid crystal molecules 52, and a plurality of photopolymerization initiators 53 is injected between the first and the second orientation films AL1 and AL2. The liquid crystal molecules 52 are made using a nematic liquid crystal material having negative dielectric constant anisotropy Δε. The monomers 51A and the liquid crystal molecules 52 are uniformly homeotropically oriented in an almost vertical direction between the first and the second orientation films AL1 and AL2 (the array substrate 10 and the counter substrate 20) by the rubbing treatment of the first and the second orientation films AL1 and AL2. To regulate an in-plane tilt direction of the liquid crystal molecules 52 when an electric field is applied, a pretilt angle of 85 to 88 degrees is given by the rubbing treatment. The rubbing direction at the time of the rubbing treatment is preferably orthogonal to the direction of propagation of the light-source light L because a high scattering intensity can be obtained.

In the present embodiment, a photocrosslinkable acrylate-based material represented by Chemical Formula 1 can be used as the monomers 51A. Each of the monomers represented by Chemical Formula 1 has acrylate groups having functions as photocrosslinkable groups at the right and left ends.

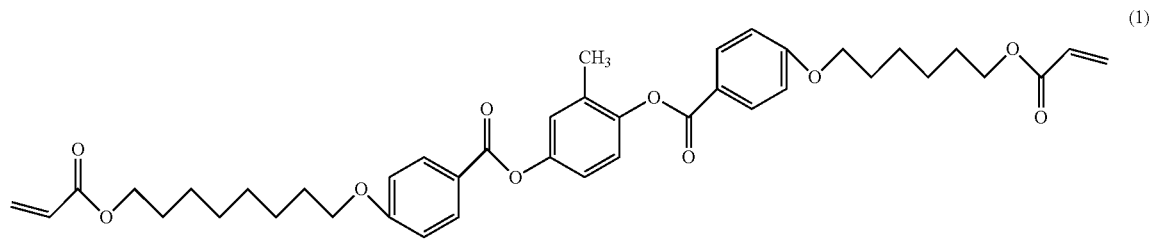 [SMILES: C=CC(=O)OCCCCCCCCOc1ccc(C(=O)Oc2ccc(OC(=O)c3ccc(OCCCCCCOC(=O)C=C)cc3)c(C)c2)cc1]

(1)

Ultraviolet irradiation causes the photopolymerization initiators 53 in the solution LC' to absorb light and generate radicals. As a result, the monomers 51A in the solution LC' perform a cross-linking reaction and are polymerized. The monomers 51A are not limited to those represented by Chemical Formula 1 above, and can be made using each of photocrosslinkable materials such as acrylate groups represented by Chemical Formulae 2-1 to 2-4 or maleimide groups represented by Chemical Formulae 2-5 to 2-8.

The ultraviolet irradiation at a predetermined wavelength causes the photopolymerization initiators 53 to generate radicals to initiate the polymerization of the monomers 51A. A material suitable for the ultraviolet wavelength to be used can be selected and used as the photopolymerization initiators 53. For example, one of the following can be used.

(±)-camphorquinone, acetophenone, benzophenone, 4-benzoylbenzoic acid, 2-benzoylbenzoic acid, methyl 2-benzoylbenzoate, 4,4'-bis(dimethylamino)benzophenone,

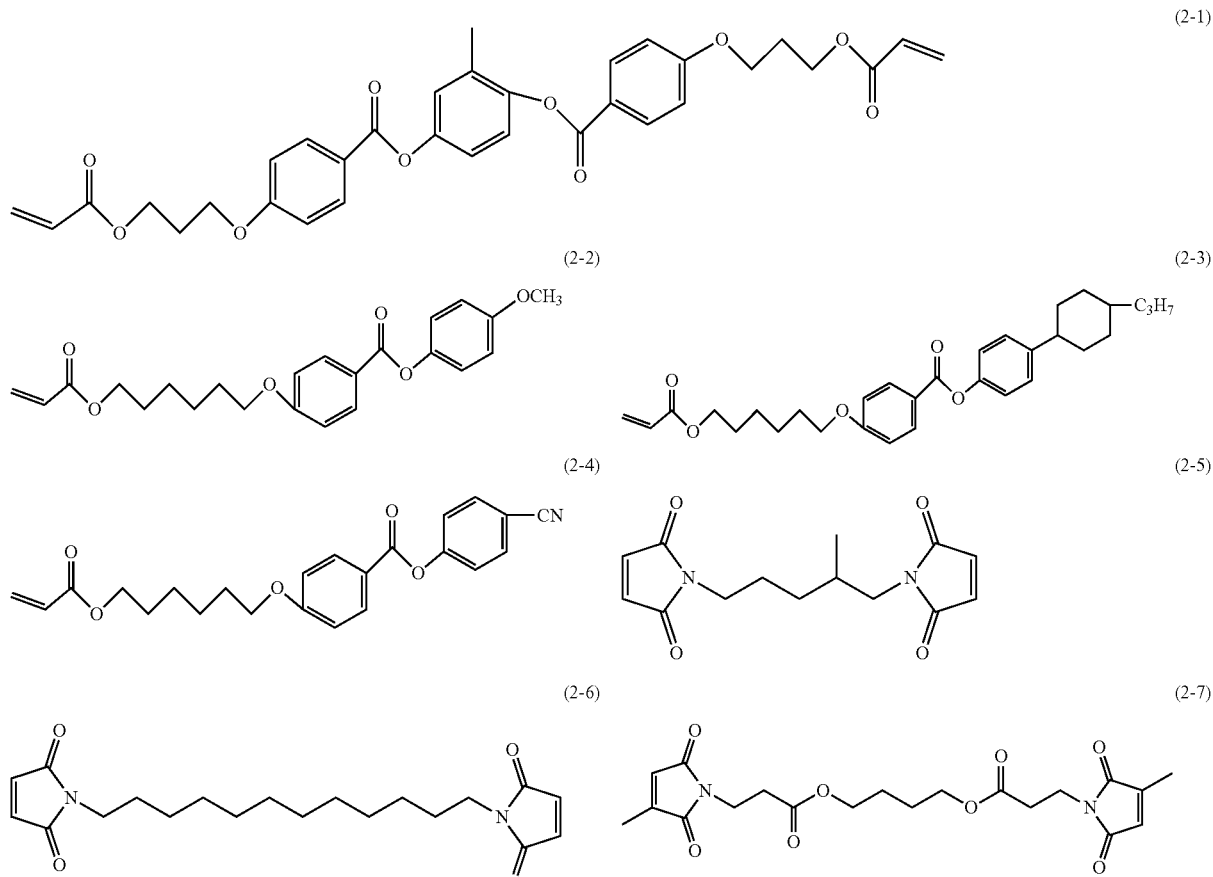

4,4'-bis(diethylamino)benzophenone, 4,4'-dichlorobenzophenone, 1,4-dibenzophenone, benzil, p-anisyl, 2-benzoyl-2-propanol, 2-hydroxy-4'-(2-hydroxyethoxy)-2-methylpropiophenone, 1-benzylcyclohexanol, benzoin, benzoin methyl ether, benzoin ethyl ether, benzoin isopropyl ether, benzoin butyl ether, o-tosyl benzoin, 2,2-diethoxyacetophenone, benzyl dimethyl ketal, 2-methyl-4'-(methylthio)-2-morpholinopropiophenone, 2-benzyl-2-(dimethylamino)-4'-monoholinobutyrophenone, 2-isonitrosopropiophenone, 2-chlorothioxanthone, 2-isopropylthioxanthone, 2,4-diethylthioxanthen-9-one, 2,2'-bis(2-chlorophenyl)-4,4,5,5'-tetraphenyl-1,2'-biimidazole, diphenyl(2,4,6-trimethylbenzoyl) phosphine oxide, phenylbis(2,4,6-trimethylbenzoyl) phosphine oxide, and lithium phenyl(2,4,6-trimethylbenzoyl)phosphinate.

The photocrosslinking (polymerizing) reaction of the monomers 51A described above forms a three-dimensional mesh-shaped polymer network 51, as illustrated in FIG. 12. This process forms the liquid crystal layer 50 including the reverse-mode polymer-dispersed liquid crystals in which the liquid crystal molecules 52 are dispersed in gaps of the polymer network 51.

Normally, when the polymer network is formed by polymerizing the monomers, the polymer network is not fixed and floats in the liquid crystal layer. Therefore, for example, a point press or a drop impact on a screen of the display panel irreversibly moves the polymer network of the liquid crystal layer, and thereby, may disturb the orientation of the liquid crystal molecules. This phenomenon causes pixel-by-pixel unevenness and reduction in contrast of the display panel, and thus, improvement is required in impact resistance of the display device (display panel).

In the present embodiment, ends (portions) of the polymer network 51 are coupled to the first and the second orientation films AL1 and AL2. As a result, the polymer network 51 is fixed to the array substrate 10 and the counter substrate 20 with the first and the second orientation films AL1 and AL2 interposed therebetween. This configuration improves the impact resistance and reliability of the display panel 2 including the liquid crystal layer 50. An end (portion) of the polymer network 51 may be coupled to only the first orientation film AL1.

The following describes the first and the second orientation films AL1 and AL2. In the present embodiment, the first and the second orientation films AL1 and AL2 are preferably orientation films that are transparent in the visible range and are formed of polyimide. The polyimide can be obtained by heating and imidizing a polyamide acid (including a polyamide acid compound). For this purpose, a liquid polyamide acid is applied to surfaces of the pixel electrode PE and the common electrode CE by, for example, spin coating, and is imidized to form the first and the second orientation films AL1 and AL2. The polyamide acid can be synthesized by reacting a tetracarboxylic acid compound (tetracarboxylic dianhydride) with a diamine compound. Therefore, as represented by Chemical Formula 3, the polyimide is formed to have a skeleton derived from tetracarboxylic dianhydride and a skeleton derived from a diamine compound.

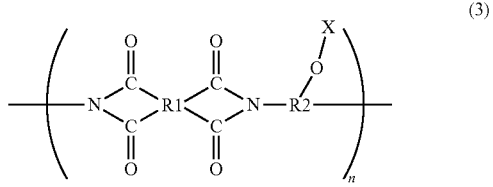

(3)

In Chemical Formula 3, R1 contained in the skeleton derived from tetracarboxylic dianhydride can be, for example, a cyclobutane skeleton, an alicyclic skeleton other than a cyclobutane skeleton, or a chain skeleton. R2 contained in the skeleton derived from a diamine compound can be, for example, an alicyclic skeleton other than a cyclobutane skeleton, or a chain skeleton. Examples of an alicyclic skeleton other than a cyclobutane skeleton include a cycloheptane skeleton and a cyclohexane skeleton. As an alicyclic skeleton, aromatic compounds can be used. However, those with less coloration of polyimide are preferable.

In the present embodiment, the polyimide serving as the material (orientation film material) of the first and the second orientation films AL1 and AL2 has a photocrosslinkable group X on a side chain of the polyimide. Specifically, the photocrosslinkable group X is provided via an ether bond to the above-mentioned R2 that forms the skeleton derived from the diamine compound. The photocrosslinking group X may be provided via an ester bond instead of an ether bond. That is, the diamine compound forming the polyimide has the photocrosslinkable group X. The photocrosslinkable group X reacts with the monomers 51A during the above-described photocrosslinking (polymerizing) reaction of the monomers 51A, and connects each of the first and the second orientation films AL1 and AL2 to the polymer network 51 (polymer fibers). This process tightly connects the first and the second orientation films AL1 and AL2 to the polymer network 51, thereby improving the impact resistance and reliability of the display panel 2 including the liquid crystal layer 50.

The photocrosslinkable group X can be provided with, for example, an acrylate group as represented by Chemical Formula 4. In this case, R illustrated in Chemical Formula 4 means a group coupled to the photocrosslinkable group and includes the ether bond or the ester bond mentioned above.

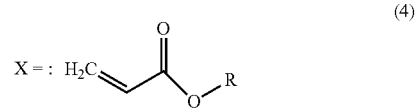

(4)

In this configuration, the photocrosslinkable group X is provided via the ether bond or the ester bond to the R2 contained in the skeleton derived from the diamine compound. As a result, the first and the second orientation films AL1 and AL2 formed of the polyimide containing the photocrosslinkable group X can be easily formed, and the first and the second orientation films AL1 and AL2 can be easily coupled to the polymer network 51. Since the photocrosslinkable group X is provided on the side chain of the polyimide, the degree of freedom of orientation is higher than when the photocrosslinkable group X is provided on a polymer main chain, and the efficiency of the photocrosslinking (polymerizing) reaction between the photocrosslinkable group X and the photocrosslinkable monomers 51A can be increased during the formation of the polymer network 51.

The photocrosslinkable group X is not limited to the acrylate group. At least one of a methacrylate group, a cinnamic acid group, a maleimide group, a phenyldiazirine, and a phenylazide represented by Chemical Formulae 5-1 to 5-5 may be provided on the side chain of the polyimide. Any one of these photocrosslinkable groups X may be provided on the main chain of the polyimide, or at an end of the side chain or the main chain.

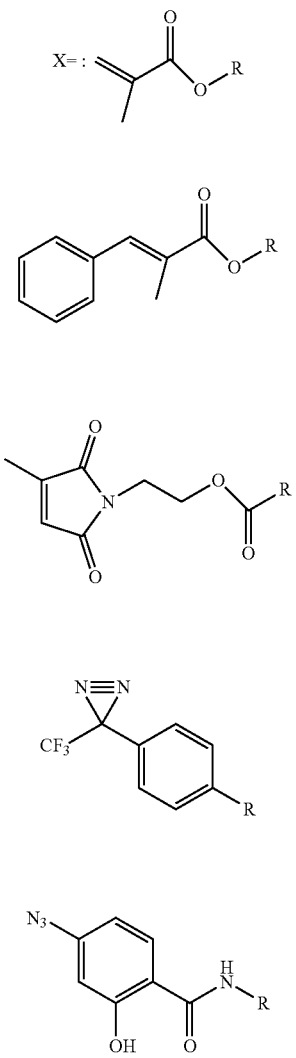

(5-1)

(5-2)

(5-3)

(5-4)

(5-5)

The following describes the polyimide having other configurations. Although the above has described the configurations of the polyimide having the photocrosslinkable group X on the side chain, configurations can also be employed in which the polyimide has the photocrosslinkable group on the main chain. Specifically, the polyimide having a diazo group represented by Chemical Formula 6-1 or the polyimide having a benzophenone group represented by Chemical Formula 6-2 can be employed as the photocrosslinkable group for the R1 contained in the skeleton derived from tetracarboxylic dianhydride in Chemical Formula 3. In Chemical Formulae 6-1 and 6-2, Et denotes an ethyl group. Structural formulae illustrated in Chemical Formulae 6-1 and 6-2 are examples, and other configurations may be used as long as the polyimide has a diazo group or a benzophenone group.

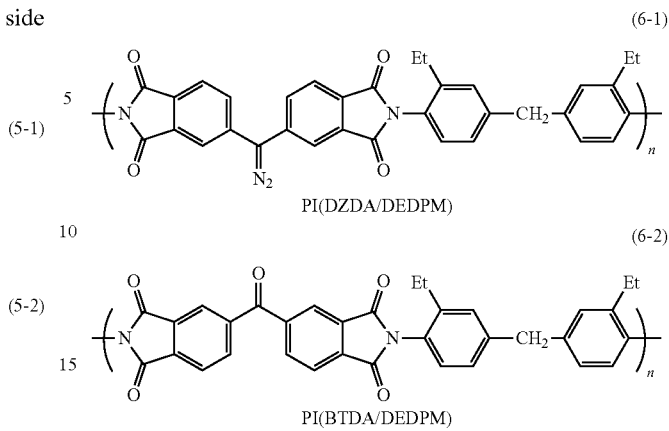

PI(DZDA/DEDPM) (6-1)

PI(BTDA/DEDPM) (6-2)

In these configurations, since the polyimide originally has a functional group that serves as a photocrosslinkable group, the first and the second orientation films AL1 and AL2 can be easily coupled to the polymer network 51. The photocrosslinkable group is provided on the main chain of the polyimide. Therefore, after the first and the second orientation films AL1 and AL2 are coupled to the polymer network 51, the polymer network 51 is difficult to move, and thus, can be fixed.

In the above-described configurations, both the polymer network 51 and the liquid crystal molecules 52 are optically anisotropic. The orientation of the liquid crystal molecules 52 is controlled by a voltage difference between the pixel electrode PE and the common electrode CE. For example, as illustrated in FIG. 12, the orientation of an optical axis AX1 of the polymer network 51 is substantially equal to orientations of optical axes AX2 of the liquid crystal molecules 52 when no voltage is applied between the pixel electrode PE and the common electrode CE. The optical axes AX2 of the liquid crystal molecules 52 are parallel to the direction PZ (FIG. 5) of the liquid crystal layer 50. The optical axis AX1 of the polymer network 51 is parallel to the direction PZ of the liquid crystal layer 50 regardless of whether a voltage is applied. The voltage applied to the pixel electrode PE changes the orientation of the liquid crystal molecules 52. The degree of scattering of light passing through the pixel Pix (region on the pixel electrode PE) changes with the change in the orientation of the liquid crystal molecules 52.

In the present embodiment, considering that the first and the second orientation films AL1 and AL2 are vertical orientation films, the polyimide represented by Chemical Formula 7 is preferably used. In the polyimide represented by Chemical Formula 7, the acrylate group that is the photocrosslinkable group X is provided at an end of a side chain. This acrylate group is coupled to the ether group via R3 that is a chain skeleton. This R3 is a long-chain alkyl group ($(CH_2)n$, where n=1 to 12), in particular, n=6 to 12. Furthermore, the pretilt angle of the liquid crystal molecules 52 can be more easily increased as the density of the long-chain alkyl group increases. Therefore, this configuration is effective when the orientation films are the vertical orientation films.

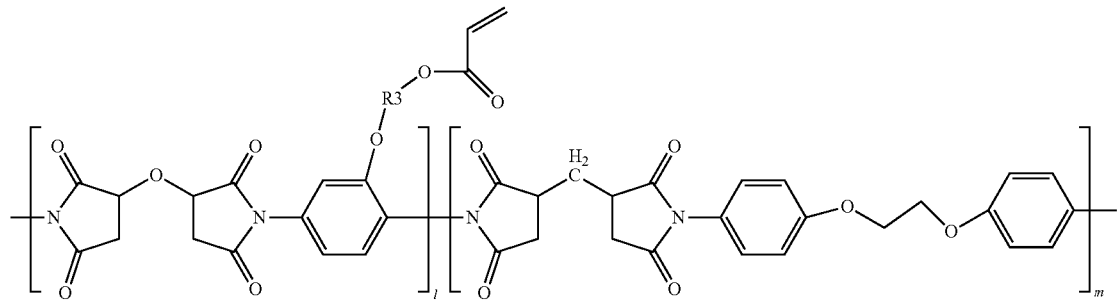

(7)

When no voltage is applied between the pixel electrode PE and the common electrode CE, the difference in refractive index between the polymer network 51 and the liquid crystal molecules 52 is zero in all directions. As a result, the liquid crystal layer 50 is placed in the non-scattering state of not scattering the light-source light L (FIG. 5). When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 14, in the gap between the pixel electrode PE and the common electrode CE having a voltage applied thereto, the optical axes AX2 of the liquid crystal molecules 52 are inclined by an electric field E generated between the pixel electrode PE and the common electrode CE. Since the optical axis AX1 of the polymer network 51 is not changed by the electric field E, the orientation of the optical axis AX1 of the polymer network 51 differs from the orientations of the optical axes AX2 of the liquid crystal molecules 52. The light-source light L is scattered in the pixel Pix including the pixel electrode PE having a voltage applied thereto. The viewer views a part of the light-source light L that is emitted outward from the first principal surface 10A of the array substrate 10 or the first principal surface 20A of the counter substrate 20 as described above.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is received from the image transmitter 91, the voltage is applied to the pixel electrode PE of the pixel Pix for displaying an image, and an image based on the third input signal VCSA becomes visible together with the background. In this manner, the image is displayed in the display region when the polymer-dispersed liquid crystals LC are in the scattering state.

The light-source light L is scattered in the pixel Pix including the pixel electrode PE to which the voltage is applied, and emitted outward to display the image, which is displayed so as to be superimposed on the background. That is, the display device 1 of the present embodiment can display the image so as to be superimposed on the background by combining the emission light 68 or 68A with the background.

The electric field E generated between the pixel electrode PE and the common electrode CE is not applied to the first slit 60 because no electrode is provided at the first slit 60. Therefore, the electric field E is applied in oblique directions with respect to the third direction PZ from the pixel electrode PE to the common electrodes CE provided on opposite sides of the first slit 60. This configuration allows the electric field E to control the orientation direction of the liquid crystal molecules 52.

Figure 15:
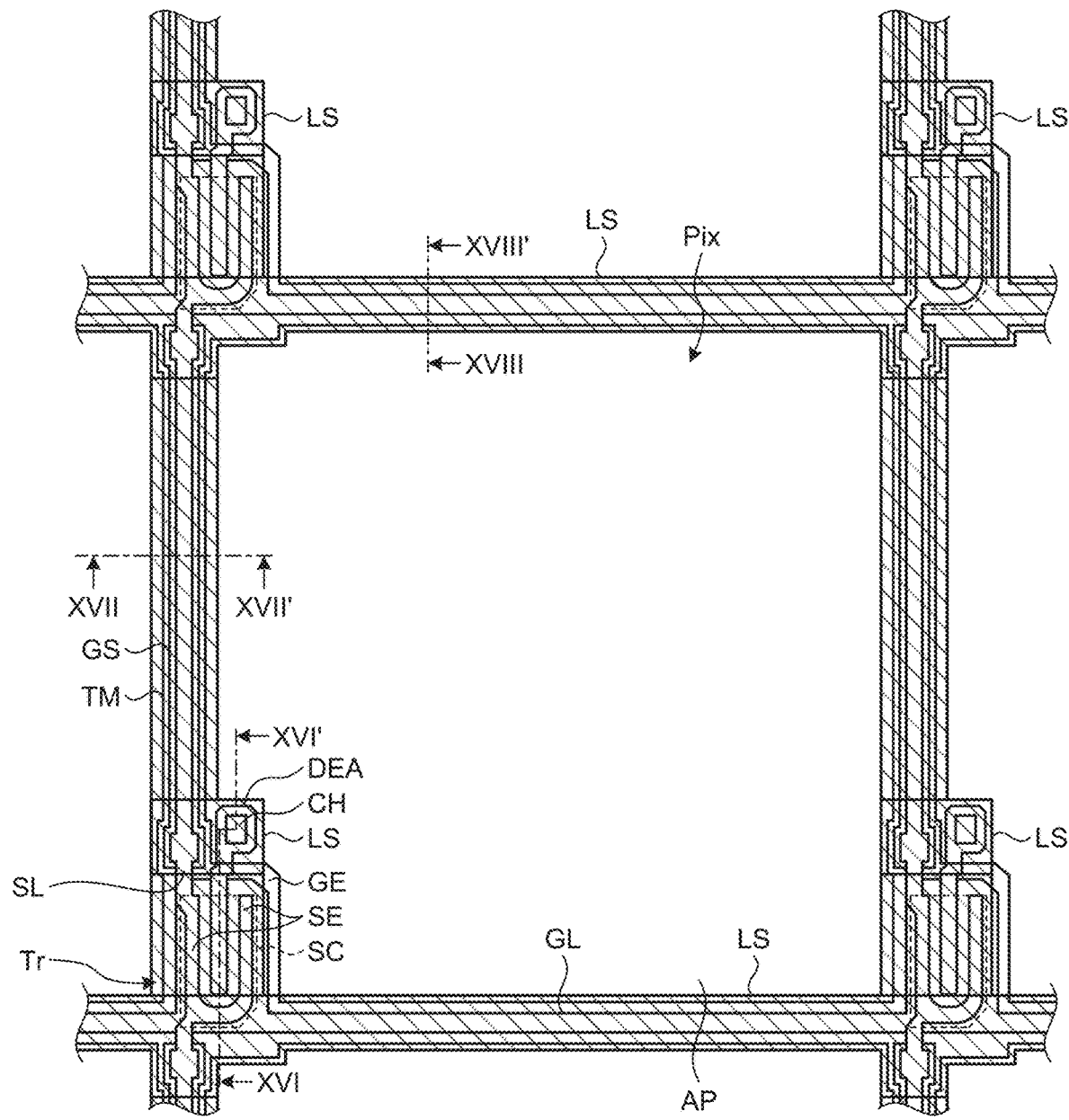
FIG. 15 is a plan view illustrating a light-blocking layer in the pixel.
Figure 16:
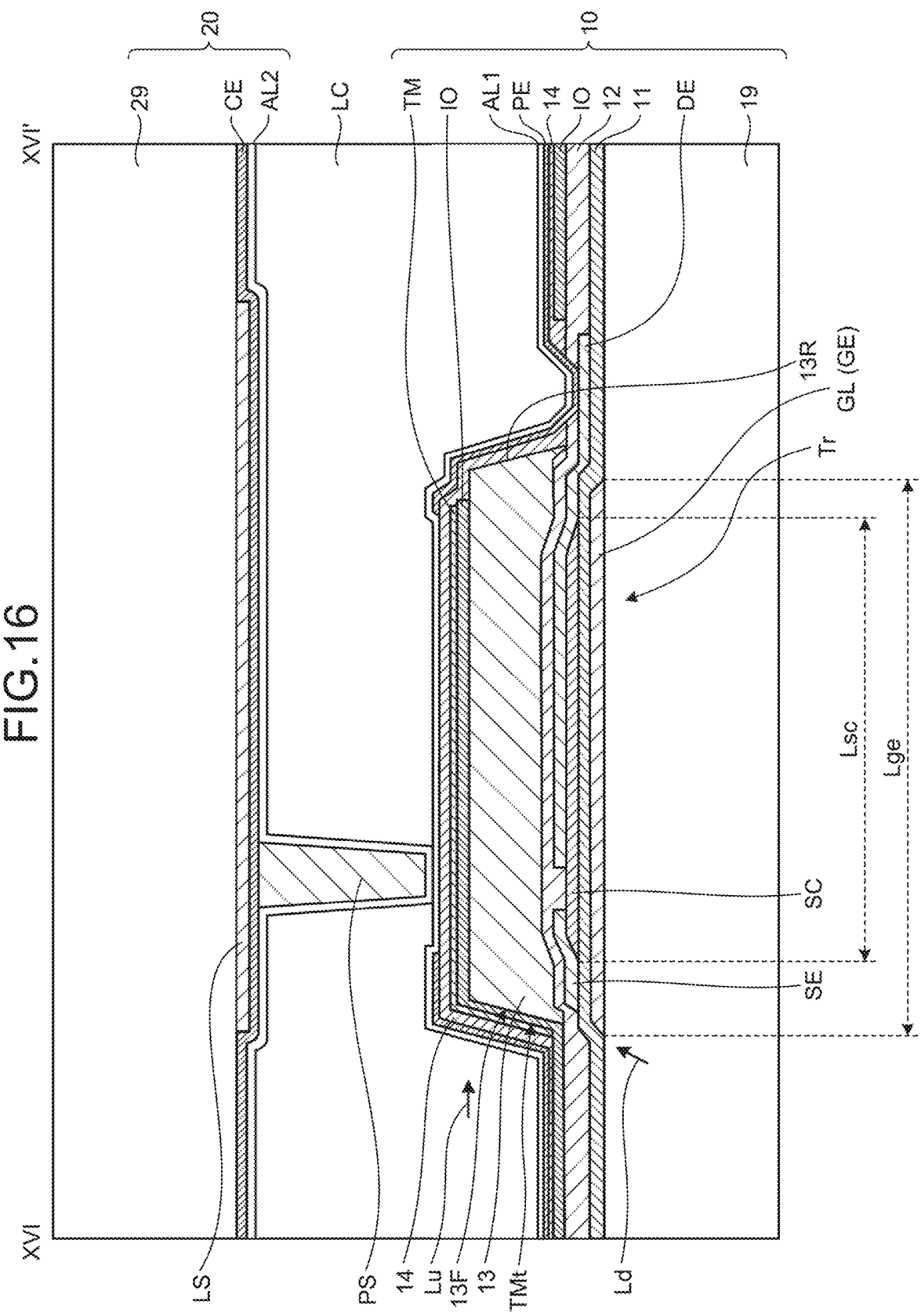
FIG. 16 is a sectional view along XVI-XVI' of FIG. 15.
Figure 17:
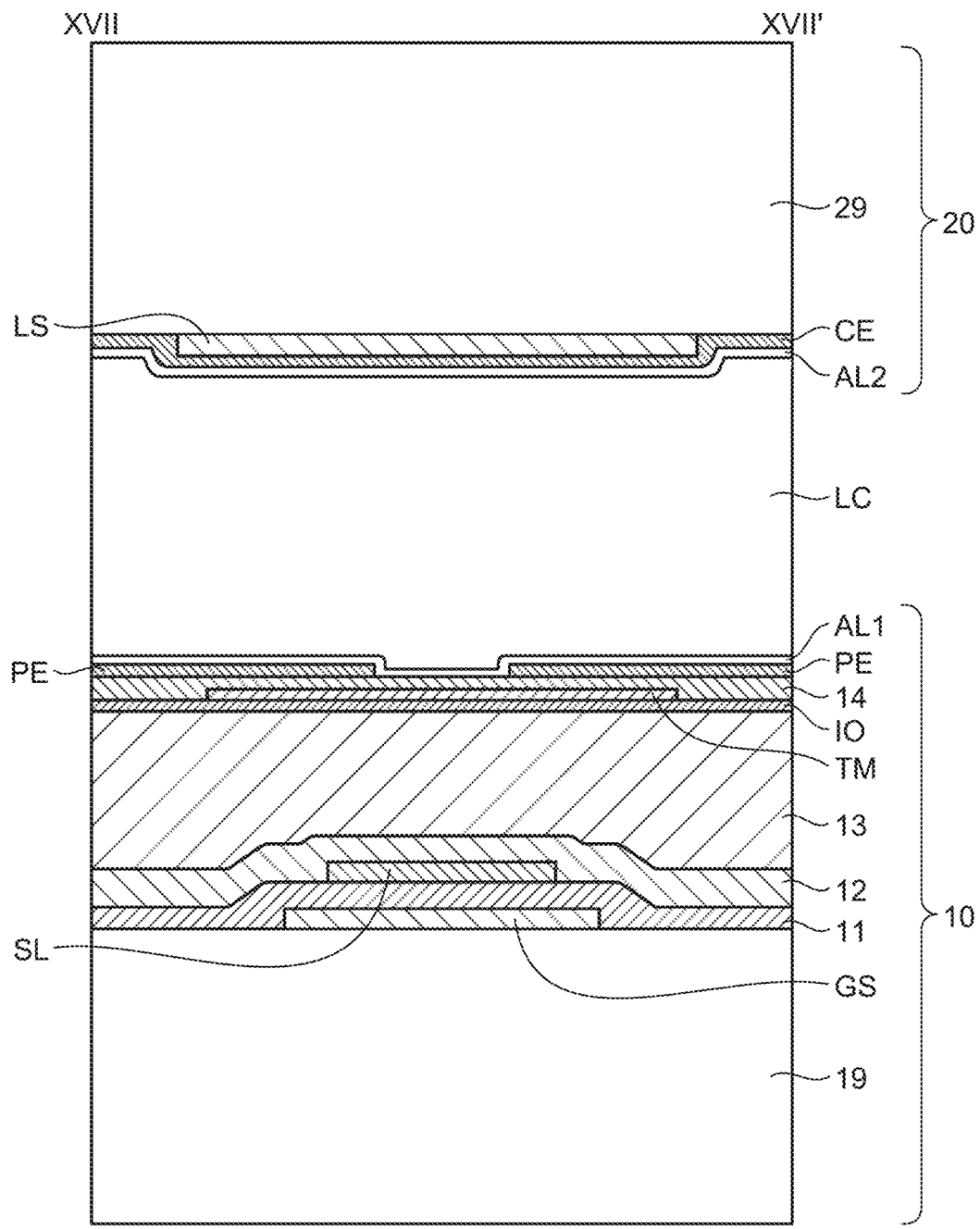
FIG. 17 is a sectional view along XVII-XVII' of FIG. 15.
Figure 18:
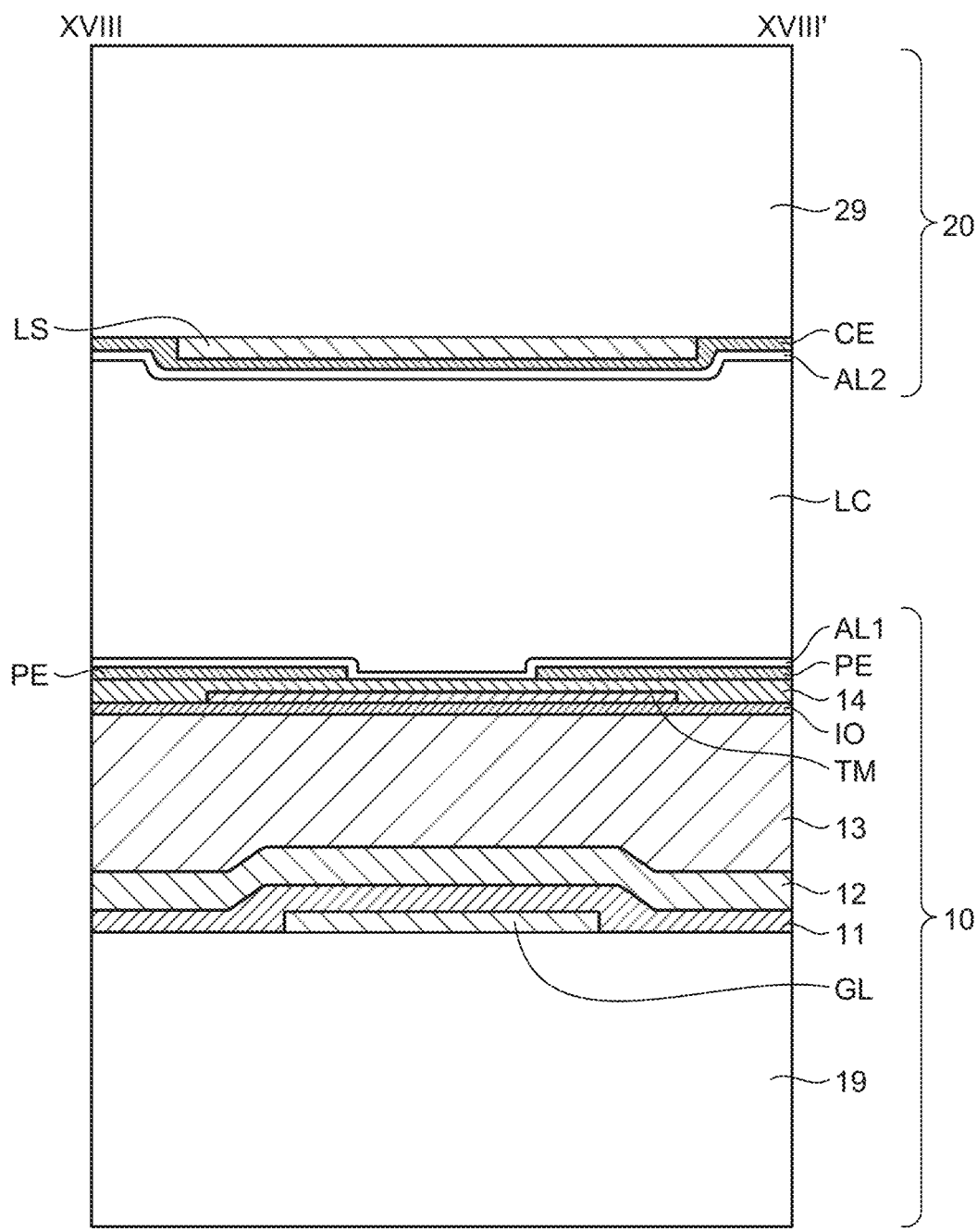
FIG. 18 is a sectional view along XVIII-XVIII' of FIG. 15.

FIG. 15 is a plan view illustrating a light-blocking layer in the pixel. FIG. 16 is a sectional view along XVI-XVI' of FIG. 15. FIG. 17 is a sectional view along XVII-XVII' of FIG. 15. FIG. 18 is a sectional view along XVIII-XVIII' of FIG. 15.

As illustrated in FIG. 16, the scan line GL (refer to FIG. 7) and the gate electrode GE are provided on the first light-transmitting base member 19.

In addition, as illustrated in FIG. 16, a first insulating layer 11 is provided so as to cover the scan line GL and the gate electrode GE. The first insulating layer 11 is formed of, for example, a transparent inorganic insulating material such as silicon nitride.

The semiconductor layer SC is stacked on the first insulating layer 11. The semiconductor layer SC is formed of, for example, amorphous silicon, but may be formed of polysilicon or an oxide semiconductor. When viewed in the same section, a length Lsc of the semiconductor layer SC is smaller than a length Lge of the gate electrode GE overlapping the semiconductor layer SC. With this configuration, the gate electrode GE can block light Ld that has propagated in the first light-transmitting base member 19. As a result, the light leakage through the switching element Tr of the first embodiment is reduced.

The source electrode SE and the signal line SL covering a portion of the semiconductor layer SC and the drain electrode DE covering a portion of the semiconductor layer SC are provided on the first insulating layer 11. The drain electrode DE is formed of the same material as that of the signal line SL. A second insulating layer 12 is provided on the semiconductor layer SC, the signal line SL, and the drain electrode DE. The second insulating layer 12 is formed of, for example, a transparent inorganic insulating material such as silicon nitride, in the same manner as the first insulating layer 11.

A third insulating layer covering a portion of the second insulating layer 12 is formed on the second insulating layer 12. A third insulating layer 13 is formed of, for example, a light-transmitting organic insulating material such as an acrylic resin. The third insulating layer 13 has a larger film thickness than other insulating films formed of an inorganic material.

As illustrated in FIGS. 16, 17, and 18, some regions have the third insulating layer 13 while the other regions do not have the third insulating layer 13. As illustrated in FIGS. 17 and 18, the regions having the third insulating layer 13 are located over the scan lines GL and over the signal lines SL. The third insulating layer 13 has a grid shape along the scan lines GL and the signal lines SL and covers over the scan lines GL and the signal lines SL along the scan lines GL and the signal lines SL. As illustrated in FIG. 16, the regions having the third insulating layer 13 are also located over the semiconductor layer SC, that is, over the switching elements Tr. As a result, the switching element Tr, the scan line GL, and the signal line SL are located at relatively long distances from the holding capacitance electrode ITO and are thereby less affected by a common potential from the holding capacitance electrode ITO. In addition, regions on the array substrate 10 not having the third insulating layer 13 are provided in the regions surrounded by the scan lines GL and the signal lines SL. Thus, regions are provided in which the thickness of the insulating layer is smaller than the thickness of the insulating layer overlapping the signal lines SL and the scan lines GL in plan view. The regions surrounded by the scan lines GL and the signal lines SL have relatively higher optical transmittance than the regions over the scan lines GL and over the signal lines SL, and thus, are improved in light transmitting capability.

As illustrated in FIG. 16, a metal layer TM is provided on the third insulating layer 13. The conductive metal layer TM is wiring of a metal such as molybdenum (Mo) or aluminum (Al), a multilayered body of these metals, or an alloy thereof. As illustrated in FIG. 12, the metal layer TM is provided in a region overlapping the signal lines SL, the scan lines GL, and the switching elements Tr in plan view. With this configuration, the metal layer TM is formed into a grid shape, and openings AP surrounded by the metal layer TM are formed.

As illustrated in FIG. 16, the holding capacitance electrode IO is provided on the upper side of the third insulating layer 13 and on the lower side of the metal layer TM. The holding capacitance electrode IO is formed of a light-transmitting conductive material such as indium tin oxide (ITO). The holding capacitance electrode IO is also called "third light-transmitting electrode".

As illustrated in FIG. 8, the holding capacitance electrode IO has a region IOX including no light-transmitting conductive material in the region surrounded by the scan lines GL and the signal lines SL. The holding capacitance electrode IO extends across the adjacent pixels Pix and is provided over the pixels Pix. A region of the holding capacitance electrode IO including the light-transmitting conductive material overlaps the scan line GL or the signal line SL and extends to the adjacent pixel Pix.

The holding capacitance electrode IO has a grid shape that covers over the scan lines GL and the signal lines SL along the scan lines GL and the signal lines SL. With this configuration, the holding capacitance HC between the region IOX including no light-transmitting conductive material and the pixel electrode PE is reduced. Therefore, the holding capacitance HC is adjusted by the size of the region IOX including no light-transmitting conductive material.

As illustrated in FIG. 9, the switching element Tr coupled to the scan line GL and the signal line SL is provided. At least the switching element Tr is covered with the third insulating layer 13 serving as an organic insulating layer, and the metal layer TM having a larger area than that of the switching element Tr is located above the third insulating layer 13. This configuration can reduce the light leakage through the switching element Tr.

More specifically, the array substrate 10 includes the third insulating layer 13 serving as an organic insulating layer that covers at least the switching element Tr, and the metal layer TM that is provided above the third insulating layer 13 so as to overlap the third insulating layer 13 and has a larger area than that of the switching element Tr. The region surrounded by the scan lines GL and the signal lines SL has a region having a smaller thickness than that of the third insulating layer 13 that overlaps the scan lines GL and the signal lines SL in plan view. This configuration forms a slant surface along which the thickness of the third insulating layer 13 changes, the slant surface being located on a side of the third insulating layer 13 closer, in plan view, to the light source 3 than the switching element Tr is. As illustrated in FIG. 5, the light-source light L emitted from the light source 3 is incident in the second direction PY serving as a direction of incidence. As illustrated in FIG. 16, the slant surfaces described above include a first slant surface 13F and a second slant surface 13R. The first slant surface 13F is a surface on a side of the third insulating layer 13 on which light Lu of the light-source light L is incident, and the second slant surface 13R is a surface on a side opposite to the side on which the light Lu is incident. As illustrated in FIG. 15, a metal layer TMt covers the first slant surface 13F on the side of the third insulating layer 13 on which the light Lu is incident. The metal layer TMt is a tapered portion that is formed of the same material as that of the metal layer TM and is formed by extending the metal layer TM.

As illustrated in FIG. 16, the light Lu arrives in the direction of incidence. The light Lu is part of the light-source light L that arrives from a side closer to the light source 3 than the switching element Tr is. The metal layer TMt blocks the light Lu, and thereby, reduces the light leakage.

The metal layer TM may be located on the lower side of the holding capacitance electrode IO, and only needs to be stacked with the holding capacitance electrode IO. The metal layer TM has a lower electrical resistance than that of the holding capacitance electrode IO. Therefore, the potential of the holding capacitance electrode IO is restrained from varying with the position where the pixel Pix is located in the display region AA.

As illustrated in FIG. 9, the width of the metal layer TM overlapping the signal line SL is larger than that of the signal line SL in plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scan line GL is larger than the width of the scan line GL. The width of the metal layer TM and the width of the scan line GL are lengths in a direction intersecting the extending direction of the scan line GL.

As illustrated in FIG. 16, a fourth insulating layer 14 is provided on the upper side of the holding capacitance electrode IO and the metal layer TM. The fourth insulating layer 14 is an inorganic insulating layer formed of, for example, a transparent inorganic insulating material such as silicon nitride.

As illustrated in FIG. 16, the pixel electrode PE is provided on the fourth insulating layer 14. The pixel electrode PE is formed of a light-transmitting conductive material such as ITO. The pixel electrode PE is electrically coupled to the contact electrode DEA through the contact hole CH provided in the fourth insulating layer 14, the third insulating layer 13, and the second insulating layer 12.

As illustrated in FIG. 16, the second light-transmitting base member 29 is provided with the common electrode CE. The common electrode CE is formed of a light-transmitting conductive material such as ITO. The second orientation film AL2 is provided on a surface of the common electrode CE. The counter substrate 20 includes a light-blocking layer LS between the second light-transmitting base member 29 and the common electrode CE. The light-blocking layer LS is formed of a resin or a metal material colored in black. A spacer PS is formed between the array substrate 10 and the counter substrate 20. The spacer PS is located between the common electrode CE and the second orientation film AL2.

As illustrated in FIGS. 9 and 17, in the display device of the first embodiment, a light-blocking layer GS located in the same layer as that of the scan line GL is provided in a position extending along the signal line SL and overlapping a portion of the signal line SL. The light-blocking layer GS is formed of the same material as that of the scan line GL. The light-blocking layer GS is not provided at a portion where the scan line GL intersects the signal line SL in plan view.

As illustrated in FIG. 9, the light-blocking layer GS is electrically coupled to the signal line SL through a contact hole CHG. This configuration makes the wiring resistance obtained by combining the light-blocking layer GS with the signal line SL lower than that of only the signal line SL. As a result, the delay of the gradation signal supplied to the signal line SL is reduced. The contact hole CHG need not be provided, and the light-blocking layer GS need not be coupled to the signal line SL.

As illustrated in FIG. 17, the light-blocking layer GS is provided opposite the metal layer TM with the signal line SL therebetween. The width of the light-blocking layer GS is larger than that of the signal line SL, and smaller than that of the metal layer TM. The width of the light-blocking layer GS, the width of the metal layer TM, and the width of the signal line SL are lengths in a direction intersecting the extending direction of the signal line SL. In this manner, the light-blocking layer GS has a larger width than that of the signal line SL, and thus, restrains the reflected light reflected by the edges of the signal line SL from being emitted from the display panel 2. As a result, the visibility of images is improved in the display device 1.

As illustrated in FIGS. 15 and 16, the counter substrate 20 is provided with the light-blocking layer LS. The light-blocking layer LS is provided in a region overlapping the signal lines SL, the scan lines GL, and the switching elements Tr in plan view.

As illustrated in FIGS. 15, 16, 17, and 18, the light-blocking layer LS has a larger width than that of the metal layer TM. This configuration restrains reflected light reflected by edges of the signal line SL, the scan line GL, and the metal layer TM from being emitted from the display panel 2. As a result, the visibility of images is improved in the display device 1.

The contact hole CH and the contact hole CHG are likely to diffusely reflect the light-source light L emitted thereto. Therefore, the light-blocking layer LS is provided in an area overlapping the contact holes CH and CHG in plan view.

As illustrated in FIG. 16, the spacer PS is disposed between the array substrate 10 and the counter substrate 20 and improves the uniformity of the distance between the array substrate 10 and the counter substrate 20.

Figure 19:
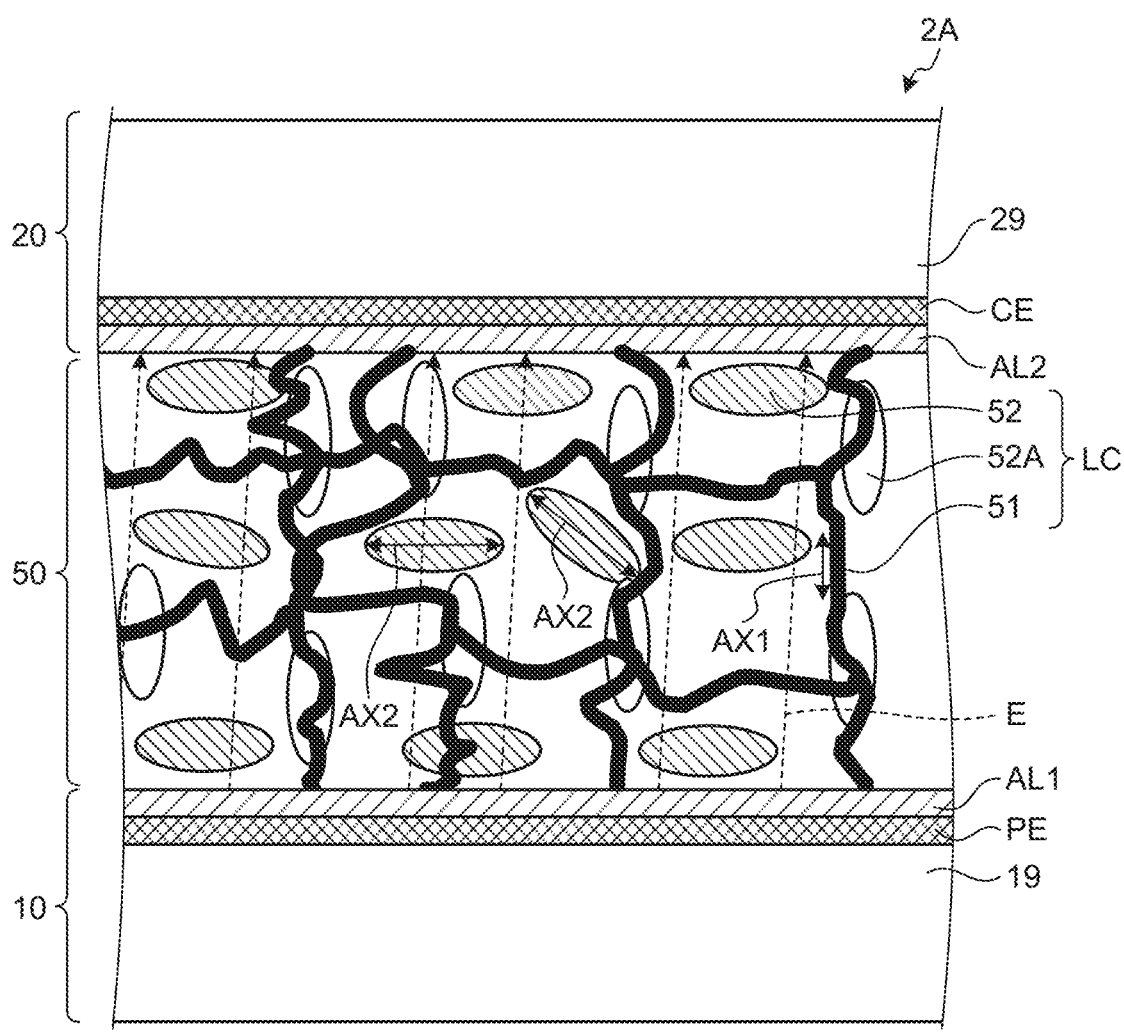
FIG. 19 is a sectional view for describing the scattering state of the liquid crystal layer according to a comparative example.

FIG. 19 is a sectional view for describing the scattering state of the liquid crystal layer according to a comparative example. Compared with the display panel 2 illustrated in FIG. 14, a display panel 2A according to the comparative example illustrated in FIG. 19 does not have the first slits 60 provided to the common electrode CE.

As illustrated in FIG. 19, in the display panel 2A according to the comparative example, when a voltage is applied between the pixel electrode PE and the common electrode CE, the optical axes AX2 of the liquid crystal molecules 52 are inclined with respect to the third direction PZ by the electric field generated between the pixel electrode PE and the common electrode CE. Since the optical axis AX1 of the polymer network 51 is not changed by the electric field, the orientation of the optical axis AX1 of the polymer network 51 differs from the orientations of the optical axes AX2 of the liquid crystal molecules 52. The liquid crystal molecules near the first and the second orientation films AL1 and AL2 may behave differently from those in the central portion of the liquid crystal layer 50. Therefore, the initial orientation of the liquid crystal molecules in the central portion of the liquid crystal layer 50 varies. As a result, when a voltage is applied to the pixel electrode PE, the liquid crystal molecules may be driven in random directions.

In contrast, in the display panel 2 according to the first embodiment, the electric field E is applied in oblique directions with respect to the third direction PZ from the pixel electrode PE to the common electrodes CE provided on opposite sides of the first slit 60. Therefore, the electric field E can control the orientation of the optical axis AX2 of the liquid crystal molecules 52 in the central portion of the liquid crystal layer 50 to an intended orientation.

As a result, the liquid crystal molecules 52 are affected by the electric field E applied in oblique directions with respect to the third direction PZ, and the orientations of the optical axes AX2 of the liquid crystal molecules 52 are rotated by the electric field E while being restrained from behaving randomly, thus reducing variations in scattering characteristics of the liquid crystal molecules that depend on the applied voltage.

Second Embodiment

Figure 20:
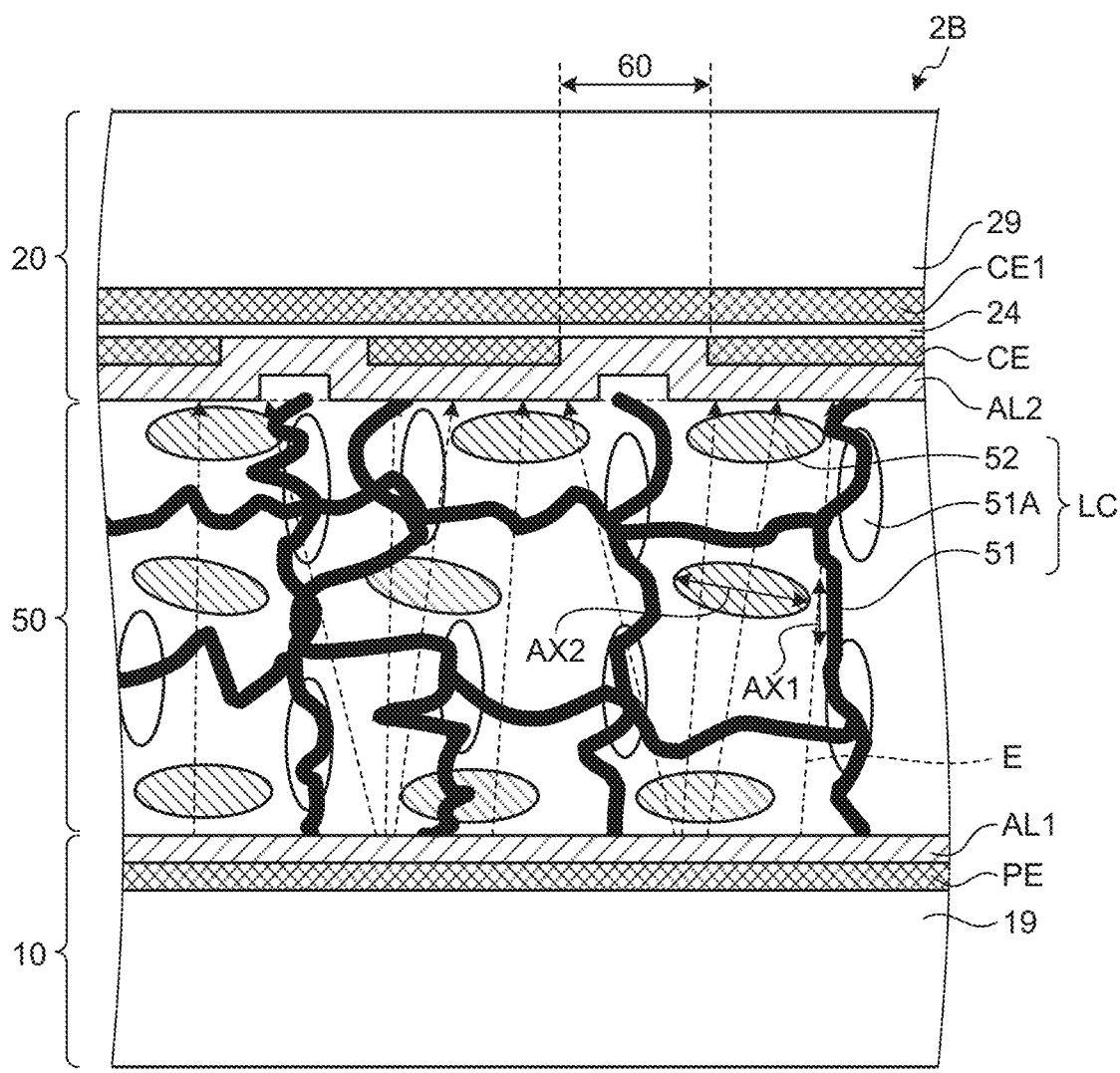
FIG. 20 is a schematic sectional view for describing the scattering state of the liquid crystal layer according to a second embodiment of the present disclosure.

FIG. 20 is a schematic sectional view for describing the scattering state of the liquid crystal layer according to a second embodiment of the present disclosure. The same components as those described in the first embodiment above are denoted by the same reference numerals, and the description thereof will not be repeated.

As illustrated in FIG. 20, in a display panel 2B according to the second embodiment, a third electrode CE1 is provided above the common electrode CE and the first slits 60 with an insulating film 24 interposed therebetween and is provided between the insulating film 24 and the second light-transmitting base member 29. The third electrode CE1 has the same potential as the common electrode CE.

The insulating film 24 is an organic insulating film formed, for example, of a light-transmitting organic insulating material.

When a voltage is applied to the pixel electrode PE and the electric field E is generated from the pixel electrode PE toward the common electrode CE, the electric field E is not applied to the first slit 60 because no common electrode CE is provided in the first slit 60. Since a portion of the third electrode CE1 that overlaps the first slit 60 is covered with the insulating film 24, the electric field E is difficult to be applied to the first slit 60. Since the common electrode CE is not covered with the insulating film 24, more electric field can easily be applied to the common electrode CE than to the third electrode CE1.

Therefore, the electric field E is applied in oblique directions from the pixel electrode PE to the common electrodes CE provided on opposite sides of the first slit 60. As a result, the liquid crystal molecules 52 are affected by the electric field E applied in oblique directions with respect to the third direction PZ, and the orientations of the optical axes AX2 of the liquid crystal molecules 52 are rotated by the electric field E while being restrained from behaving randomly, thus reducing the variations in the scattering characteristics of the liquid crystal molecules that depend on the applied voltage.

Third Embodiment

Figure 21:
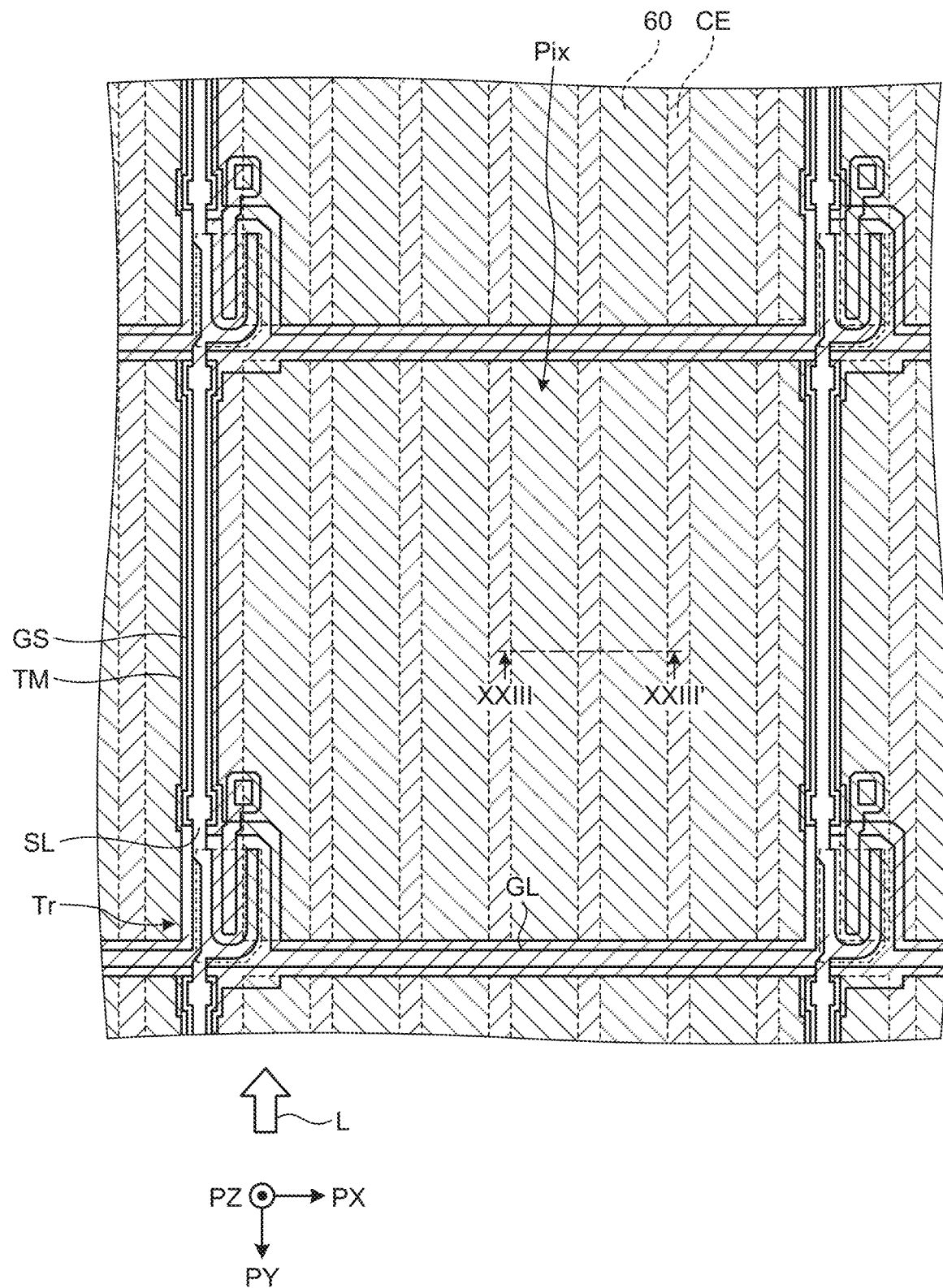
FIG. 21 is a plan view for describing the common electrode according to a third embodiment of the present disclosure.
Figure 22:
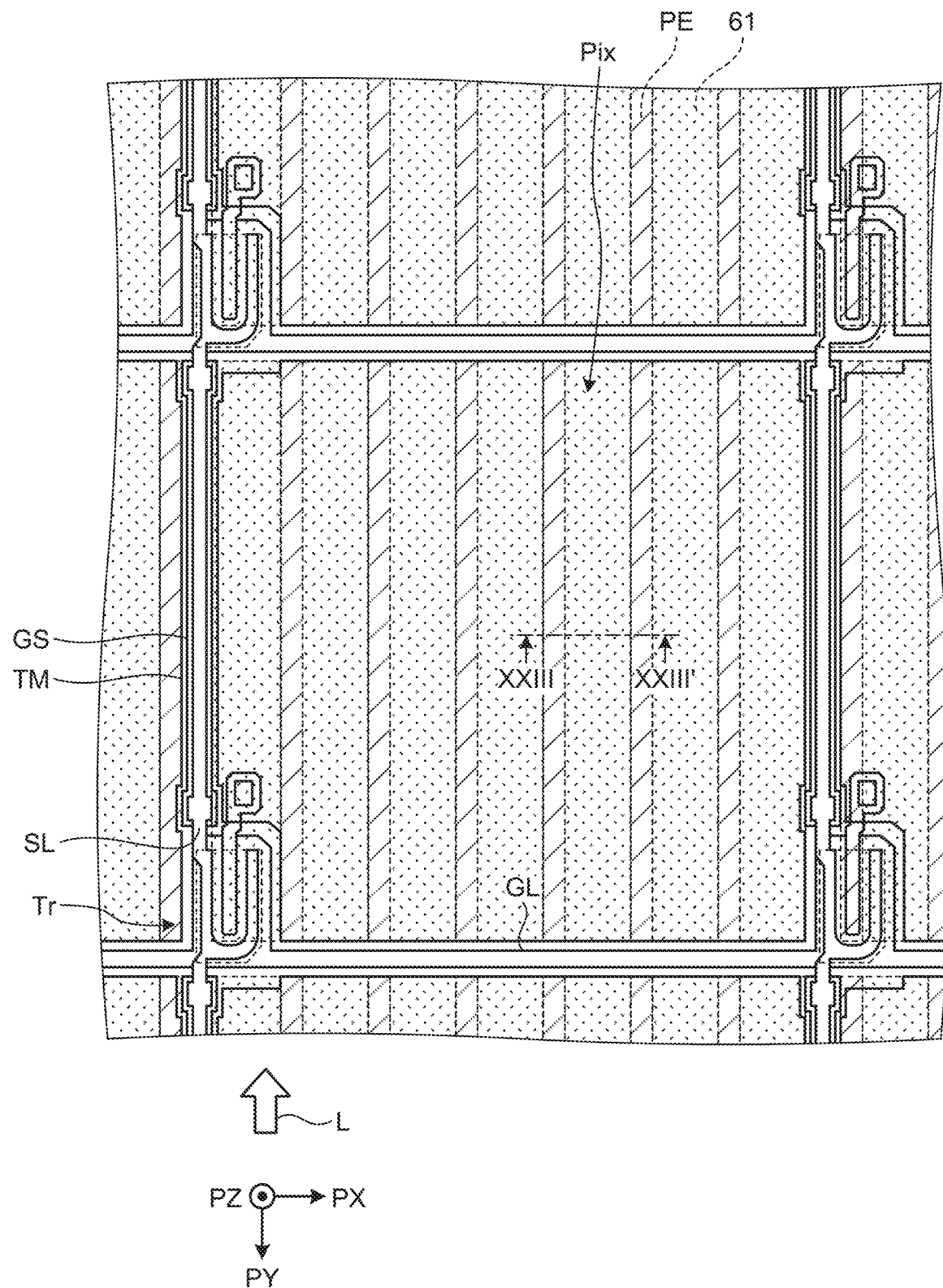
FIG. 22 is a plan view for describing the pixel electrode according to the third embodiment.
Figure 23:
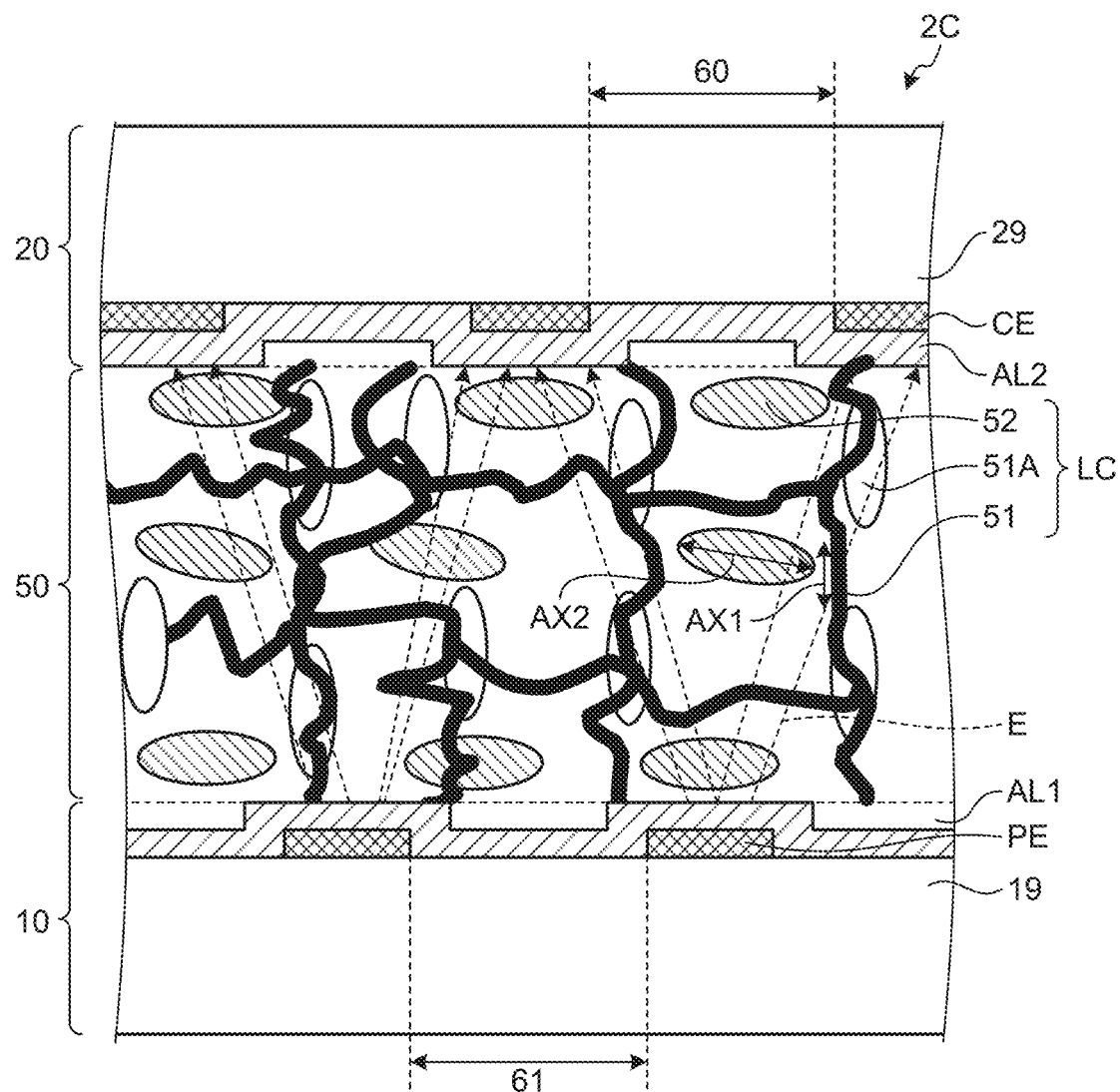
FIG. 23 is a sectional view along XXIII-XXIII' of FIGS. 21 and 22.

FIG. 21 is a plan view for describing the common electrode according to a third embodiment of the present disclosure. FIG. 22 is a plan view for describing the pixel electrode according to the third embodiment. FIG. 23 is a sectional view along XXIII-XXIII' of FIGS. 21 and 22. The same components as those described in the first embodiment above are denoted by the same reference numerals, and the description thereof will not be repeated.

As illustrated in FIG. 21, the first slits 60 provided for each of the pixels Pix are arranged at predetermined intervals in the first direction PX between the common electrodes CE, and each of the first slits 60 is provided so as to extend in the second direction PY intersecting the first direction PX. The ends of the first slit 60 overlap the scan lines GL. The ends of the first slit 60 are closed by the light-transmitting conductive material of the common electrode CE at locations overlapping the scan lines GL. The width of the first slit 60 is 10 µm, for example. The width of the first slit 60 is preferably 3 µm to 20 µm.

As illustrated in FIG. 22, the pixel electrodes PE are separate from each other so as to correspond to the pixels Pix. A plurality of second slits 61 provided for each of the pixels Pix are arranged at predetermined intervals in the first direction PX between the pixel electrodes PE, and each of the second slits 61 is provided so as to extend in the second direction PY intersecting the first direction PX. The ends of the second slit 61 overlap the scan lines GL. The ends of the second slit 61 are closed by a light-transmitting conductive material of the pixel electrode PE at locations overlapping the scan lines GL. The width of the second slit 61 is 10 µm, for example. The width of the second slit 61 is preferably 3 µm to 20 µm.

As illustrated in FIG. 23, in a display panel 2C according to the third embodiment, the first slit 60 overlaps the second slit 61. The central portion of the first slit 60 is arranged so as to face the pixel electrode PE. The central portion of the second slit 61 is arranged so as to face the central portion of the common electrode CE.

When a voltage is applied to the pixel electrode PE and the electric field E is generated from the pixel electrode PE toward the common electrode CE, the electric field E is not applied to the first slit 60 because no common electrode CE is provided in the first slit 60. Since no pixel electrode PE is provided in the second slit 61, the electric field E is not generated from the first slit 60. Therefore, the electric field E is applied in oblique directions from the pixel electrodes PE provided on opposite sides of the second slit 61 toward the common electrodes CE provided on opposite sides of the first slit 60. As a result, the liquid crystal molecules 52 are affected by the electric field E applied in oblique directions with respect to the third direction PZ, and the orientations of the optical axes AX2 of the liquid crystal molecules 52 are rotated by the electric field E while being restrained from behaving randomly, thus reducing the variations in the scattering characteristics of the liquid crystal molecules that depend on the applied voltage.

Fourth Embodiment

Figure 24:
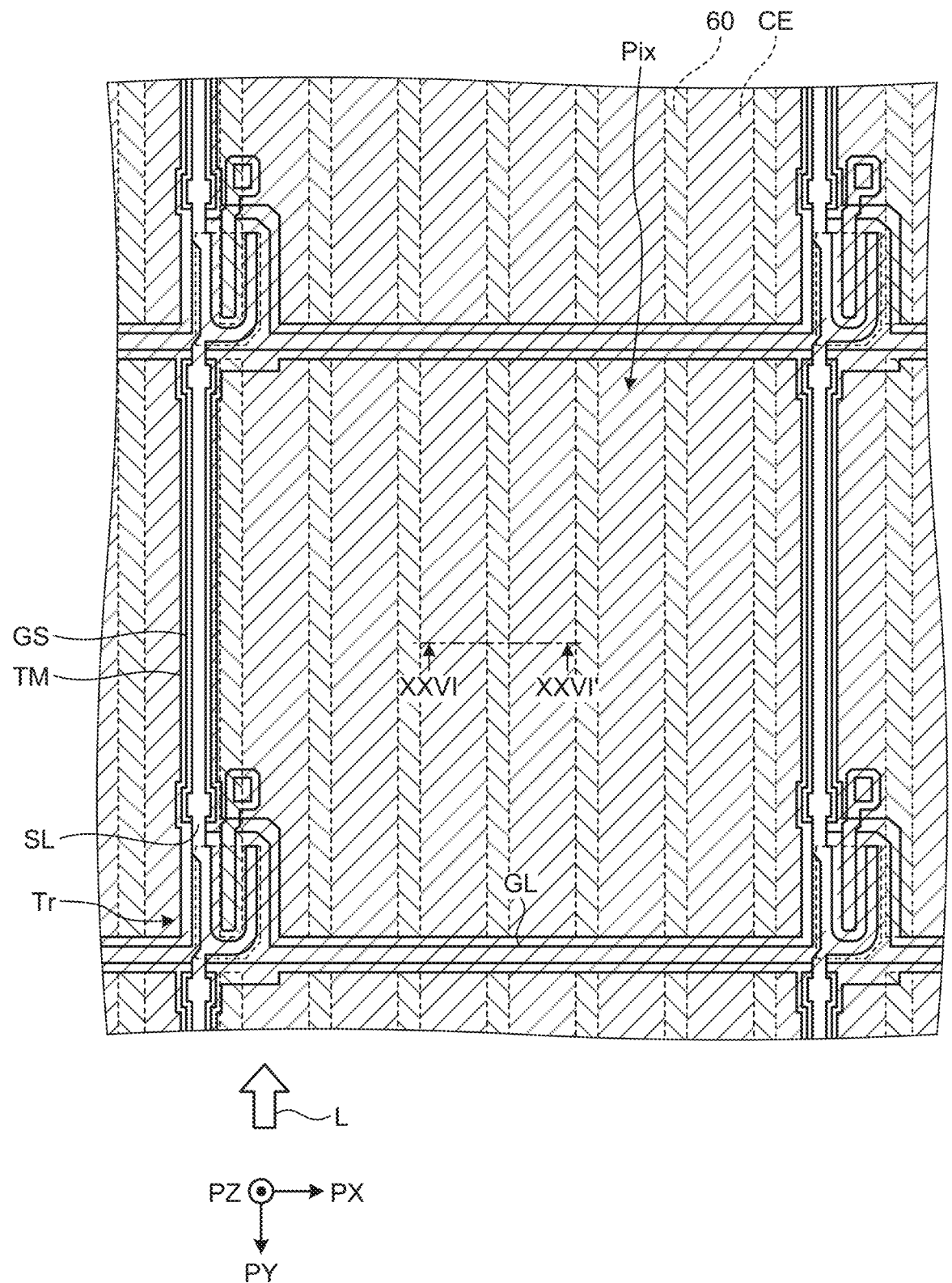
FIG. 24 is a plan view for describing the common electrode according to a fourth embodiment of the present disclosure.
Figure 25:
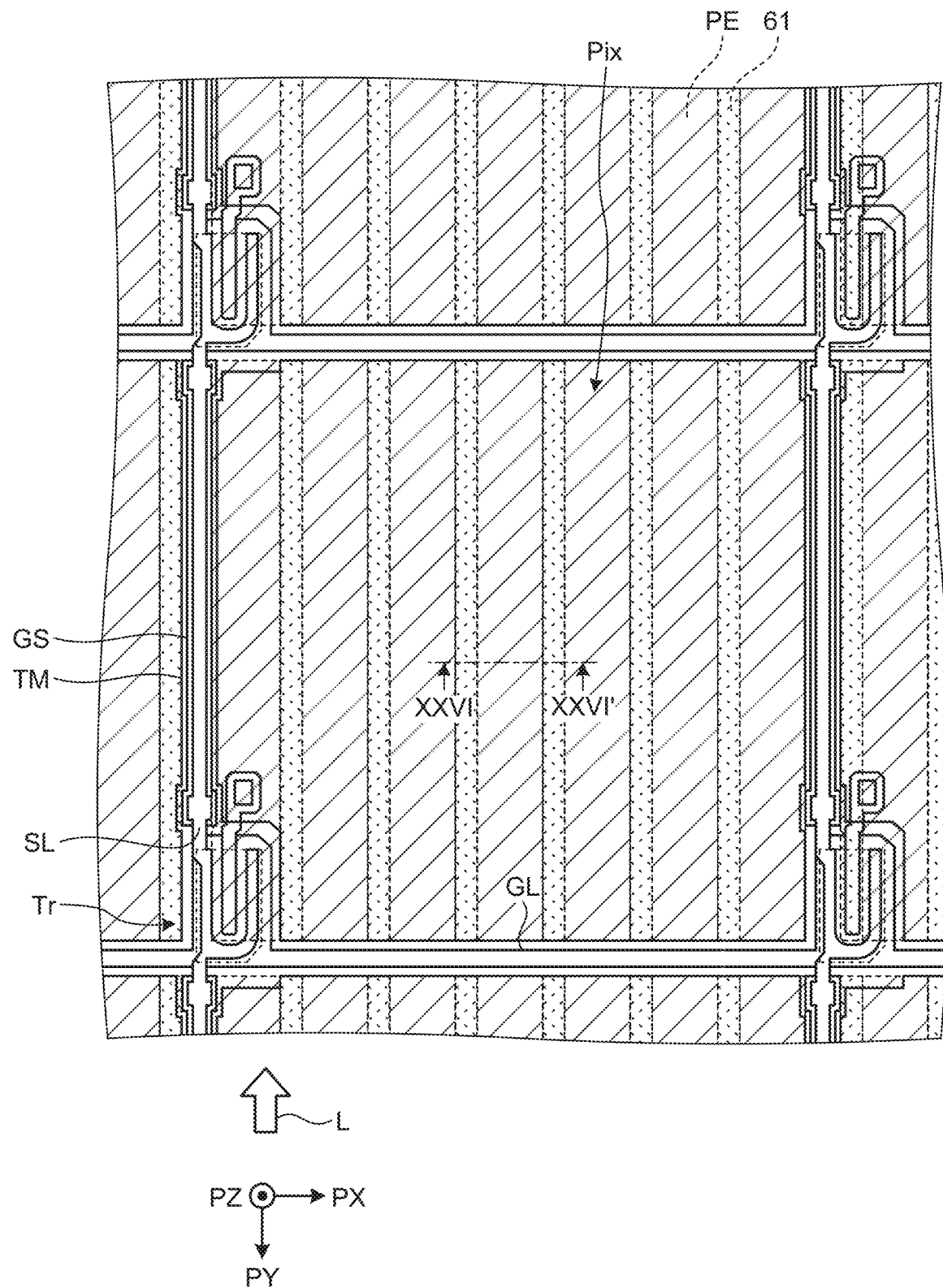
FIG. 25 is a plan view for describing the pixel electrode according to the fourth embodiment.
Figure 26:
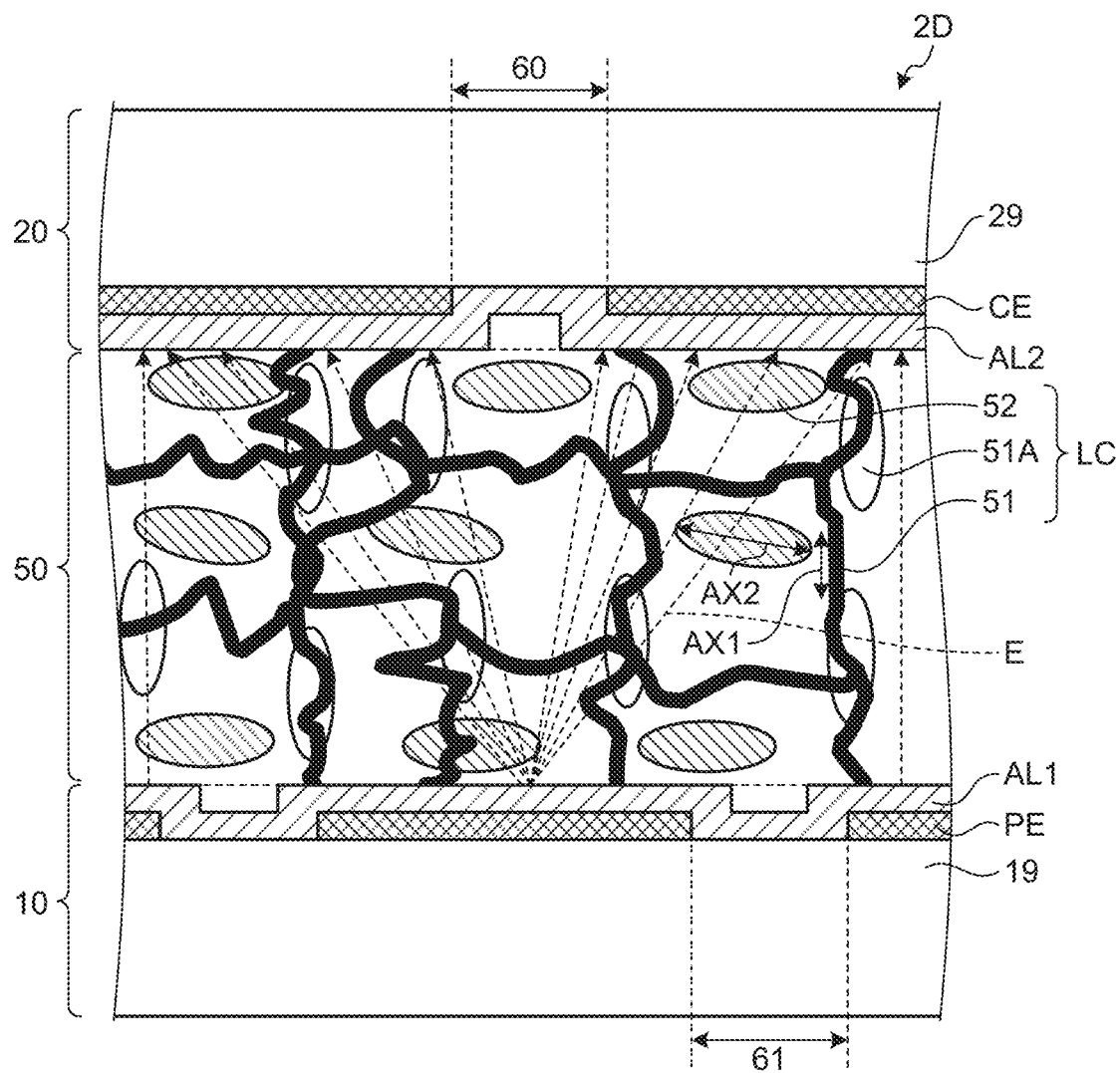
FIG. 26 is a sectional view along XXVI-XXVI' of FIGS. 24 and 25.

FIG. 24 is a plan view for describing the common electrode according to a fourth embodiment of the present disclosure. FIG. 25 is a plan view for describing the pixel electrode according to the fourth embodiment. FIG. 26 is a sectional view along XXVI-XXVI' of FIGS. 24 and 25. The same components as those described in the embodiments above are denoted by the same reference numerals, and the description thereof will not be repeated.

As illustrated in FIG. 24, the first slits 60 provided for each of the pixels Pix are arranged at predetermined intervals in the first direction PX between the common electrodes CE, and each of the first slits 60 is provided so as to extend in the second direction PY intersecting the first direction PX. The ends of the first slit 60 overlap the scan lines GL. The ends of the first slit 60 are closed by the light-transmitting conductive material of the common electrode CE at locations overlapping the scan lines GL. The width of the first slit 60 is 5 µm, for example. The width of the first slit 60 is preferably 3 µm to 20 µm.

As illustrated in FIG. 25, the pixel electrodes PE are separate from each other so as to correspond to the pixels Pix. The second slits 61 provided for each of the pixels Pix are arranged at predetermined intervals in the first direction PX between the pixel electrodes PE, and each of the second slits 61 is provided so as to extend in the second direction PY intersecting the first direction PX. The ends of the second slit 61 overlap the scan lines GL. The ends of the second slit 61 are closed by the light-transmitting conductive material of the pixel electrode PE at locations overlapping the scan lines GL. The width of the second slit 61 is 5 µm, for example. The width of the second slit 61 is preferably 3 µm to 20 µm.

As illustrated in FIG. 26, in a display panel 2D according to the fourth embodiment, the first slit 60 has a size so as not to overlap the second slit 61. The first slit 60 is arranged so as to face the central portion of the pixel electrode PE. The second slit 61 is arranged so as to face the central portion of the common electrode CE.

When a voltage is applied to the pixel electrode PE and the electric field E is generated from the pixel electrode PE toward the common electrode CE, the electric field E is not applied to the first slit 60 because no common electrode CE is provided in the first slit 60. Since no pixel electrode PE is provided in the second slit 61, the electric field E is not generated from the first slit 60. Therefore, the electric field E is applied in oblique directions from the pixel electrodes PE provided on opposite sides of the second slit 61 toward the common electrodes CE provided on opposite sides of the first slit 60. As a result, the liquid crystal molecules 52 are affected by the electric field E applied in oblique directions with respect to the third direction PZ, and the orientations of the optical axes AX2 of the liquid crystal molecules 52 are rotated by the electric field E while being restrained from behaving randomly, thus reducing the variations in the scattering characteristics of the liquid crystal molecules that depend on the applied voltage.

While the preferred embodiments have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

What is claimed is:

1. A display device comprising:
a first substrate;
a second substrate facing the first substrate;
a liquid crystal layer disposed between the first substrate and the second substrate;
a light source disposed so that light is incident on a side surface of the first substrate or a side surface of the second substrate;
a first electrode provided on the first substrate;
a second electrode provided on the second substrate;
a first scanning line and a second scanning line extending in a first direction and arranged in a second direction crossing the first direction;
a first image signal line and a second image signal line extending in the second direction and arranged in the first direction; and
a pixel provided between the first scanning line and the second scanning line in the second direction and between the first image signal line and the second image signal line in the first direction, the pixel including the first electrode,
wherein
the liquid crystal layer comprises polymer-dispersed liquid crystals comprising a polymer network formed in a mesh shape and liquid crystal molecules held in a dispersed manner in gaps of the polymer network,
the second electrode includes a plurality of first slits extending in the second direction and arranged in the first direction,
each of the first slits includes a first end and a second end opposed to the first end in the second direction,
the first end of the each of the first slits overlaps the first scanning line,
the second end of the each of the first slits overlaps the second scanning line,
a plurality of second slits of the first electrode are arranged at predetermined intervals in the first direction,
the second slits extend in the second direction, and
the first slits overlap the second slits.

2. The display device according to claim 1, wherein the second direction is a direction along a direction in which the light source emits the light.

3. The display device according to claim 1, further comprising a third electrode that is provided between the second substrate and the second electrode and covered with a light-transmitting insulating film that is provided between the third electrode and the second electrode, wherein
the third electrode overlaps the second electrode and the first slits and has the same potential as the second electrode.

4. The display device according to claim 1, wherein
the first substrate is provided with an orientation film in contact with the liquid crystal layer, and
the orientation film comprises a photocrosslinkable group coupled to the polymer network.

5. The display device according to claim 1, wherein
the first slits of the second electrode overlap the first electrode.

6. The display device according to claim 1, further comprising a plurality of the first electrodes including a first first-electrode, a second first-electrode, and a third first-electrode on the first substrate, wherein
the first first-electrode is the first electrode surrounded by the first scanning line, the second scanning line, the first image signal line, and the second image signal line,
the first first-electrode, the second first-electrode and the third first-electrode are separated with each other and arranged in the second direction,
the first electrode is located between the second first-electrode and the third first-electrode in the second direction, and
the first slits of the second electrode do not overlap the second first-electrode and the third first-electrode.

7. The display device according to claim 1, further comprising a plurality of the first electrodes including a first first-electrode, a second first-electrode, and a third first-electrode on the first substrate, wherein
the first first-electrode is the first electrode surrounded by the first scanning line, the second scanning line, the first image signal line, and the second image signal line,
the first first-electrode, the second first-electrode and the third first-electrode are separated with each other and arranged in the second direction,
the first electrode is located between the second first-electrode and the third first-electrode in the second direction, and
an entirety of the first slits of the second electrode is located between the second first-electrode and the third first-electrode in the second direction.

8. The display device according to claim 1, wherein
the first electrode does not overlap the second electrode, and
an entirety of the first electrode overlaps the first slit of the second electrode.

9. The display device according to claim 1, further comprising
a third electrode that is provided between the second substrate and the second electrodes and covered with a light-transmitting insulating film that is provided between the third electrode and the second electrodes, wherein
an entirety of the second electrode overlaps the third electrode, and
an entirety of the first slit overlaps the third electrode.

10. The display device according to claim 1, further comprising
a third electrode that is provided between the second substrate and the second electrodes and covered with a light-transmitting insulating film that is provided between the third electrode and the second electrodes; and
an orientation film between the second electrode and the liquid crystal layer,
wherein
the orientation film is in direct contact with the light-transmitting insulating film.

11. A display device comprising:
a first substrate;
a second substrate facing the first substrate;
a liquid crystal layer disposed between the first substrate and the second substrate;
a light source disposed so that light is incident on a side surface of the first substrate or a side surface of the second substrate;
a first electrode provided on the first substrate;
a second electrode provided on the second substrate;

a first scanning line and a second scanning line extending in a first direction and arranged in a second direction crossing the first direction;
a first image signal line and a second image signal line extending in the second direction and arranged in the first direction; and
a pixel provided between the first scanning line and the second scanning line in the second direction and between the first image signal line and the second image signal line in the first direction, the pixel including the first electrode,
wherein
the liquid crystal layer comprises polymer-dispersed liquid crystals comprising a polymer network formed in a mesh shape and liquid crystal molecules held in a dispersed manner in gaps of the polymer network,
the second electrode includes a plurality of first slits extending in the second direction and arranged in the first direction,
each of the first slits includes a first end and a second end opposed to the first end in the second direction,
the first end of the each of the first slits overlaps the first scanning line,
the second end of the each of the first slits overlaps the second scanning line,
a plurality of second slits of the first electrode are arranged at predetermined intervals in the first direction,
the second slits extend in the second direction,
the first electrode does not overlap the second electrode, and
an entirety of the first electrode overlaps the first slit of the second electrode.

12. A display device comprising:
a first substrate;
a second substrate facing the first substrate;
a liquid crystal layer disposed between the first substrate and the second substrate;
a light source disposed so that light is incident on a side surface of the first substrate or a side surface of the second substrate;
a first electrode provided on the first substrate;
a second electrode provided on the second substrate;
a first scanning line and a second scanning line extending in a first direction and arranged in a second direction crossing the first direction;
a first image signal line and a second image signal line extending in the second direction and arranged in the first direction;
a pixel provided between the first scanning line and the second scanning line in the second direction and between the first image signal line and the second image signal line in the first direction, the pixel including the first electrode; and
a third electrode that is provided between the second substrate and the second electrodes and covered with a light-transmitting insulating film that is provided between the third electrode and the second electrodes, wherein
the liquid crystal layer comprises polymer-dispersed liquid crystals comprising a polymer network formed in a mesh shape and liquid crystal molecules held in a dispersed manner in gaps of the polymer network,
the second electrode includes a plurality of first slits extending in the second direction and arranged in the first direction,
each of the first slits includes a first end and a second end opposed to the first end in the second direction,
the first end of the each of the first slits overlaps the first scanning line,
the second end of the each of the first slits overlaps the second scanning line,
a plurality of second slits of the first electrode are arranged at predetermined intervals in the first direction,
the second slits extend in the second direction,
an entirety of the second electrode overlaps the third electrode, and
an entirety of the first slit overlaps the third electrode.

* * * * *